(12) United States Patent  
Chrysanthakopoulos

(10) Patent No.: US 7,689,998 B1
(45) Date of Patent: Mar. 30, 2010

(54) SYSTEMS AND METHODS THAT MANAGE PROCESSING RESOURCES

(75) Inventor: Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1483 days.

(21) Appl. No.: 10/889,947

(22) Filed: Jul. 13, 2004

(51) Int. Cl.
*G06F 9/46* (2006.01)
(52) U.S. Cl. .................. 718/104; 718/100; 718/102
(58) Field of Classification Search ......... 718/100–108, 718/10; 709/107
See application file for complete search history.

(56) References Cited

U.S. PATENT DOCUMENTS

| | | | |
|---|---|---|---|
| 5,761,507 A * | 6/1998 | Govett | 718/101 |
| 6,112,243 A * | 8/2000 | Downs et al. | 709/226 |
| 6,223,207 B1 * | 4/2001 | Lucovsky et al. | 718/107 |
| 6,912,534 B2 * | 6/2005 | DeBettencourt et al. | 707/10 |
| 2003/0014521 A1 * | 1/2003 | Elson et al. | 709/225 |
| 2004/0111724 A1 * | 6/2004 | Libby | 718/100 |
| 2004/0117794 A1 * | 6/2004 | Kundu | 718/102 |
| 2005/0076336 A1 * | 4/2005 | Cutrell et al. | 718/100 |
| 2005/0183084 A1 * | 8/2005 | Cuomo et al. | 718/100 |

OTHER PUBLICATIONS

Cedric Fournet, et al., A Calculus of Mobile Agents, Proceedings of the 7th International Conference on Concurrency Theory, 1996, 16 pages.*

Fournet et al. "A Calculus of Mobile agents", 1996, Proceedings of the 7th International Conference on Concurrency Theory, pp. 406-421.*

Sybase, Adaptive Server Enterprice 12.5.1, Performance and Tuning: Basics, Aug. 2003, pp. 1-432.*

Karen Paulsell, et al., The Single-CPU Process Model, Performance and Tuning Guide: Chapter 37, http://manuals.sybase.com/onlinebooks/group-as/asg1200e/aseperf/@Generic__BookTextView/60889;pt=60765#X, Oct. 1999, 5 pages.

Using the Windows NT Operating System for Soft Real-time Control—Separating Fact from Fiction, White Paper, Rockwell Automation—Allen Bradley, http://www.ab.com/manuals/open/178912.pdf, 1998, 40 pages.

* cited by examiner

*Primary Examiner*—Meng-Ai An
*Assistant Examiner*—Willy W Huaracha
(74) *Attorney, Agent, or Firm*—Lee & Hayes, PLLC

(57) ABSTRACT

The present invention provides a port-based technique to manage processing resources that can be utilized by an Operating System. The systems and methods consider time parallelism and pre-emption through sends, receives, and execution context, wherein scheduling of execution units occurs via (aperiodic and/or periodic) communication rather than time slicing. The systems and methods employ a resource manager that listens behind a port associated with a processor, which enables the processor to transition to a reduced power consumption state. When a request for processing resources arrives at the port, the resource manager can allocate the processing resources, wake the processor, and/or return a communication, which can include a location of allocated memory and an execution context of the processor, to a reply channel. Alternatively, the resource manager can preempt the request to mitigate processing resources consumption.

30 Claims, 12 Drawing Sheets

SYSTEMS AND METHODS THAT MANAGE PROCESSING RESOURCES

TECHNICAL FIELD

The present invention generally relates to computer processing, and more particularly to systems and methods that allocate computing/processing resources in a system where all computation is based on communication.

BACKGROUND OF THE INVENTION

The personal computer has evolved from a luxury that was mainly utilized for word processing to a common household item that is utilized to manage finances, control lighting, security and entertainment systems, pay bills, store recipes, search for information, purchase/sell goods, participate in gaming, complete school assignments, etc. The evolution has been facilitated by developments and/or advancements in electrical/electronics related technologies (e.g., chip manufacturing, bus topologies, transmission medium, etc.) and software related technologies (e.g., operating systems, programming languages, networks, etc.). Such developments and/or enhancements have reduced component size, manufacturing, labor and business (MLB) expenses, and power consumption, for example, and have rendered high-performance/low cost user-friendly computing machines. Similarly, various technological developments and/or advances have transformed mainframes and workstations from basic data processing machines employed by businesses to efficient computing machines that automate control of entire plants, facilitate creating and sharing documentation, and connect employees/companies that reside in different locations around the world.

A typical computing machine is provided with software (e.g., an Operating Systems (OS) that provides a framework to execute and/or build applications, view data, control apparatuses, etc. Traditional OSs were developed under a single thread approach, wherein individual processes (e.g., tasks) are handled one at a time. For instance, if five processes were ready for execution, the CPU processes only one of the processes at any given time while the remaining processes are queued for subsequent processing. Such systems commonly employed one or more mechanisms to interrupt processing and transparently re-use resources, for example, to handle higher priority processes.

Advances in the arts lead to the introduction of a multi-threaded-multitasking environment, which set forth a notion of concurrent execution of multiple processes or subprocesses. However, with multithreaded-multitasking systems concurrent execution is constrained by the number of processors a particular computing machine employs, wherein the number of processes that can be concurrently processed is proportional to the number of processors. Thus, a single CPU multitasking system, in reality, does not process tasks concurrently. Rather, a hybrid approach is utilized that can appear to concurrently execute processes. For example, in many systems, CPU cycles are shared across multiple processes, but only one process can consume the CPU at a time and respective processes are provided with the CPU for a limited time.

Many conventional single CPU multitasking (multi-threaded) systems utilize a time-slice technique to simulate concurrent process execution and preserve responsiveness of any one task to the user or external computing nodes, including devices. For example, the CPU can be utilized to execute at least a portion of one process for one or more clock cycles (a time slice) while processes awaiting the CPU can be stored in a run queue or transition to a "sleep" or "wait" state. Upon lapse of the time slice, access to the CPU can be halted regardless of whether processing is completed; in many systems, the time slice is associated with a grace period to provide for smooth termination of processing resources after a time slice expires. The CPU can then be provided to another process for a time slice. This cycle can continue and eventually a second, third, fourth, etc. time slice is provided in order to complete execution of a process.

In many instances, sharing a system's CPU is transparent to a user and appears to provide "true" concurrent processing; although, as noted above, concurrent processing does not occur in a single CPU system. This scenario typically occurs when a few simple processes are executing. However, when CPU/memory hungry applications are executing, competition for limited processing resources and time slice-based processing (serial processing) can be readily apparent to a user. For example, a common phenomenon experienced when running several applications (e.g., word processing, spreadsheet, database, computation, etc.) is increased delay between the time a user issues an event (e.g., a mouse click) and completion of an associated task. Examples of this phenomenon include increased time to save a document or render characters on a display after pressing a key on a keyboard. In some instances, the demand for processing resources can result in a momentary system "hang" and/or a premature termination (e.g., re-boot) without invocation or instruction by the user.

The time-sharing model is a good implementation technique for abstracting true concurrency in a system and allowing a developer to program targeting the desired concurrency of their program, independent of the target. However, it requires heavy weight scheduling mechanisms and, in many cases, processor support so the thread transition is seamless and correct (not observable). Additionally, it fails to guarantee responsiveness under all circumstances since it does not require upfront reservation of resources (e.g., CPU, memory, peripheral bandwidth, etc.). Furthermore, the treatment of resources is not uniform; CPU cycles are managed transparently or with adhoc hints from the user. Memory resources and device bandwidth are managed in yet another way. In addition, the hardware system is required to have a "heartbeat" or clock tick so it can periodically check all threads/processes to determine whether they are ready for execution or if the time slice has expired. This is computationally expensive and the periodic timer consumes power cycles. The time-sharing, multi-tasking/threading model also requires a complex programming model, commonly referred to as a threading model, which is often misused and difficult to get right.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods that provide a framework for a computing environment. This framework can be utilized to implement an Operating System (OS) (e.g., run in place of or on top of essentially any traditional OS) and leverages a notion of a communication paradigm, wherein processing resources are allocated after transmitting a request for resources to execute a process, a task, a continuation, an item of execution, etc. Thus, the framework can be utilized to provide processing resources in response to communication rather than a time slice as utilized in conventional systems. This framework additionally provides a uniform treatment of resource allocation and reuse and does not rely on a notion of threads (which can be completely eliminated). In addition, the notion of time can be eliminated as a basic primitive. Instead, clock signals (e.g., messages issued by signal generators) can be treated as resources that are available for allocation like memory, CPU time and/or device bandwidth is made available.

Conventional systems typically utilize the time slice approach (rather than a communication-based approach) to processing, wherein a time slice (e.g., a time slice "$t_x$") is associated with a process and, for that period, processing resources are dedicated and/or allocated to executing at least a portion of the process. Upon lapse of the time slice, processing resources are re-allocated for a next process (which could be the same process) associated with a next time slice (e.g., "$t_{x+1}$"). In many instances, such time slicing corresponds to a system clock (e.g., internal or external), wherein the processor expends resources locating processes to handle with each clock tick/cycle. The time slice approach is commonly utilized in conventional multitasking environments, wherein tasks can appear to be concurrently executing even though they are serialized and executed within respective time slices. A user of an application can see this serialization even though the operating advertises real-time concurrent processing. For example, the user can invoke an event (e.g., via mouse click) and the time in which the system responds and the length of time consumed to respond depend on processing resources demand, placement of the task in a task queue, etc.

The subject framework provides a novel port-based approach, which considers time parallelism and pre-emption through sends, receives, and execution context, wherein scheduling of execution units occurs via communication rather than time slicing. Thus, rather than utilizing a fixed clock and providing a predefined period in which a task can be executed (at least in part), the present invention provides for a "free running" system that responds to communication. This enables the processor to limit power and/or processing consumption (e.g., to essentially zero) unless and/or until a request for processing resources is transmitted by a client, whereas conventional systems typically consume power at least at clock frequency.

Although a clock is not necessary, the resource manager can compose with a clock (e.g., via a signal generator) for any client that desires periodicity and/or to facilitate preemption. This novel port-based approach can provide a reservation type scheme, wherein a client can request processing resources, a port to execute continuations, and, optionally, a clock. This enables a client to bind a port for such execution and, optionally, introduce periodicity. It is to be appreciated that a clock tick can be just another message received on a port that a client can utilize as a timeout or as a means to throttle utilization of resources. For example, a timeout can be implemented by just counting messages. In addition, the underlying infrastructure typically utilizes a similar mechanism to throttle utilization of message allocations, thus providing a scale invariant technique to control execution.

It is to be appreciated that the systems and methods of the present invention can additionally be considered as novel improvements over traditional cooperative (e.g., event/message) based systems. In general, such systems utilize cooperative multitasking, wherein a process currently controlling a CPU typically must offer control to other processes; therefore, programs must cooperate in order for the system to work. Thus, if one program does not cooperate, this non-cooperative program can consume the CPU such that other programs cannot utilize the CPU. This is in contrast to multi-threaded systems (e.g., as described above) that typically force applications to share the CPU based on a time slice, whether the applications are willing to or not. The present invention can mitigate cooperative multitasking by throttling and preempting through turning each interaction into a request for a message allocation, etc. Thus, the present invention can mitigate both cooperative multitasking (e.g., by event/message based systems) and time-sharing multitasking (e.g., by thread-based systems).

The novel framework of the present invention includes a resource manager that handles requests for processing resources and/or allocates such resources. A typical request for processing resources can include a request to execute within a processing context (e.g., typically one per processor) and a reply channel (or a reply port) for a response and can be associated with a continuation (e.g., a task). In general, a relatively small number of initial requests are provided upon application startup; however, the resources manager allocates substantially all subsequent messages. The foregoing provides for throttling. For example, for a client application to do any computation the client application has to ask for a message resource (e.g., memory). Upon allocating message recourses, the client can utilize the resource as a request on some port to trigger computation of some other client application or system process. The resource manager can be associated with a port (or a port service) of a processor and can listen behind the port, and such port can also be a resource allocated by interacting with the resource manager.

With this approach, one or more communications (e.g., an interrupt request (IRQ), a message, a signal, etc.) can concurrently arrive at an allocated dispatcher port that can have processors. The one or more communications can be received, prioritized and/or stored within and/or across queues that can be associated with disparate priority levels. These queues can be scrutinized and communications stored therein can be handled based on respective priority levels, for example.

By leveraging this communication only paradigm, wherein the client code only issues sends (e.g., the receive operation can be translated to a request to receive with a callback, etc.), a client does not have to wait for a reply and/or any acknowledgement after transmitting a communication. Instead, the current client execution routine stops execution since it has registered a future callback associated with the receive operation. If the resource manager determines that the requested resources are available and that these resources should be provided for execution of a task, the resource manager can transmit a communication to a reply channel, wherein the communication can include a location of allocated memory, a context of execution, etc. In other instances, the resource manager can preempt a request and mitigate processing resource consumption.

It is to be appreciated that the novel systems of the present invention can be modeled via mobile process algebras such as asynchronous pi calculus and join calculus, for example. Thus, programming languages inspired by such models can target this system in a more natural way than traditional OS application programming interfaces (APIs). In addition, a programmer can write in a synchronous receive fashion, wherein a compiler can target the novel runtime of the present invention by re writing the synchronous receive code to an asynchronous choice request with a continuation attached.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
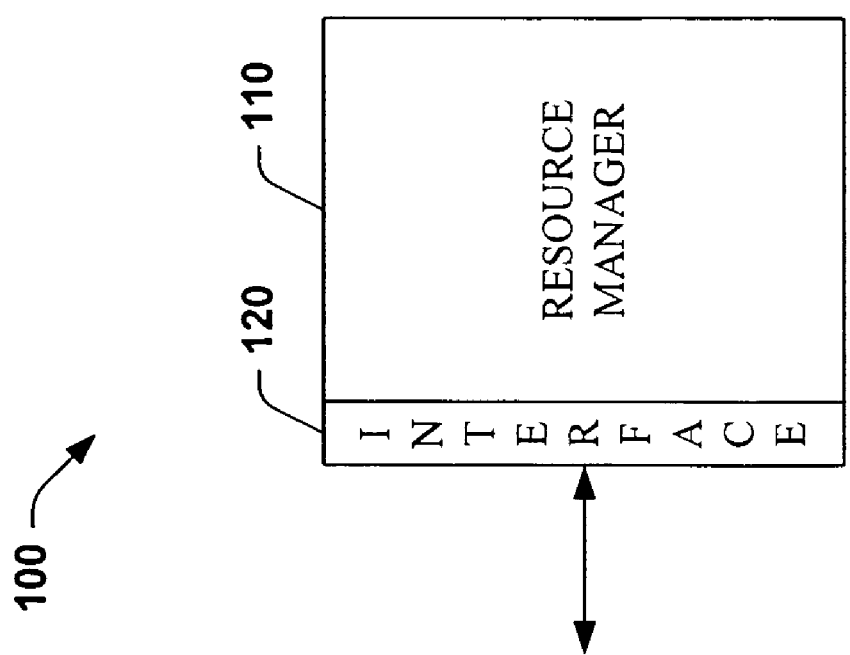
FIG. 1 illustrates an exemplary system that manages processing resources.

The present invention relates to systems and methods that consider time, parallelism and preemption in a computing environment through sends, receives, and execution context. In general, scheduling of execution units occurs based on communication (rather than time slicing), which provides for a "free running" (clockless) port-based approach to managing processing resources, for example, by an Operating System (OS). This approach can enable a processor to transition to a reduced power consumption state when its processing resources are not requested. When a client request for the processing resources is transmitted to an allocated port, it can be queued and subsequently utilized to allocate processing resources. A communication (e.g., with the location of memory, a context of execution, etc.) can then be sent to a reply channel or the request can be preempted in order to mitigate consumption of processing resources.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that manages processing resources. The system comprises a resource manager 110 and an interface component (hereafter interface) 120. The resource manager 110 can be utilized in essentially any environment wherein one or more clients execute processes in another entity's context of execution (or execution context). For example, an application executing on a computer typically utilizes the computer's memory (e.g., hard drive, RAM, cache, etc.) to store instructions and/or data and the computer's processor(s) to execute the instructions and/or process the data. The resource manager 110 can facilitate allocation of such memory and/or the processor in the form of messages allocated through interaction with the resource manager 110. In another example, a client (e.g., application or computer) can request data and/or processing from one or more disparate servers (e.g., distributed processing). The resource manager 110 can coordinate such processing by managing the clients/servers' processing resources. Although the foregoing illustrates two possible computer related examples, it is to be understood that the invention is not so limited. For example, the resource manager 110 can be utilized in other computer-related scenarios and with essentially any state machine.

In general, the resource manager 110 can be associated with the processing resources of an entity. When such an association is established, the resource manager 110 can receive one or more (e.g., all or a subset thereof) communications (e.g., messages, interrupts, etc.) directed to the entity. In one aspect of the invention, an incoming communication can include a request for resources and/or a request for a context of execution. Such a request can include a particular resource (e.g., a quantity, a location, etc.) and/or context or other information that can be utilized to determine suitable resources and context. In addition, the communication can include a return location (e.g., an address) or a name (e.g., an alias), which can be the requesting client's location and name and/or the location and name of another client. For example, a first client can request processing resources for a second client, wherein communication from the resource manager 110 can be conveyed to either the first or the second client. Furthermore, the communication can include timing information that indicates when and how often the resource manager 110 can communicate with the client. Moreover, the communication can include information related to an item (e.g., a task, a continuation, etc.) that will be processed by the allocated resources.

Such communications can be stored in a temporary or permanent storage area (e.g., a buffer, volatile memory, nonvolatile memory, a register, etc.) or handled upon arrival. When handling a communication, the resource manager 110 can extract the aforementioned information (e.g., the resources request, the context, a reply path, etc.), as well as other information residing within or conveyed with the communication. It is to be appreciated that the communication can be variously packaged. For example, the communication can be received as a stream, one or more bursts and/or one or more data packets. In addition, the communication can be compressed, encrypted, encoded, modulated, encapsulated within an envelope, etc. Upon extracting information from the communication, the resource manager 110 can analyze, interpret, decipher, etc. the information and determine the purpose of communication. Thus, if a communication includes a request for memory, the resource manager 110 can extract this request and determine the quantity, location, type, etc. of requested memory and/or allocate such resources.

In addition, the resource manger 110 can utilize any extracted information to determine whether a response is warranted. For example, where the communication is a request for memory, the resource manager 110 can check for available memory. It is to be appreciated that memory can be modeled in non-traditional ways. For example, in one aspect of the present invention memory is only available in the form of messages that are allocated through interaction with the resource manager 110. As with traditional messaging systems, messages typically are only utilized by one process at a time or they can be enforced to be write-once, read many. If the requested resources are not available, the resource manager 110 can accordingly notify the component, ignore or disregard the communication and/or forward the communication to another port associated with different processor. In instances where the requested resources can be fulfilled but are not available, the resource manager 110 can postpone transmitting any communication until the resources become free. However, it is to be appreciated that the resource manager 110 can determine not to provide any processing resources, regardless of availability. Thus, the resource manager 110 can preempt the request and/or offer a different set of resources. When the resource manager 110 grants processing resources (e.g., the resources are available and the grantor is willing to provide the resources), the resources can be utilized to execute the corresponding item.

When the resource manager 110 handles an incoming communications, the client can stop executing, wherein its context of execution can be reused for another process. When the resource manager 110 allocates suitable processing resource, the client code can be "woken" or instantiated, wherein the client can utilize allocated resources to process a continuation or task. In another aspect of the invention, the continuation or task specified can be processed with the allocated processing resources without any need to "wake" or instantiate the client.

A processor associated with the resource manager 110 can operate in a "free running," clockless mode since the resource manager 110 can handle communications for the processor as communications arrive. For example, the entity does not need to poll or search clients or queues at a periodic interval (e.g., based on an associated clock) to determine if a communication is ready to be handled. Rather, the entity can enter a state in which essentially no processing resources (e.g., processing cycles) are consumed. In addition, the resource manager 110 can transition to a similar state. The resource manager 110 can "wake" upon the arrival of a communication and respond accordingly. When operating as a communication only system with concurrency, known primitives such as join and choice can be utilized to handle concurrent, free-running message streams.

In addition, the resource manager 110 can maintain a record of allocated processing resources in order to account for available resources. Furthermore, the resource manager 110, as discussed briefly above, can limit the processing resources allocated or refrain from providing any processing resources; thus, the resource manager 110 can preempt a client from utilizing the processing resources of the entity. Moreover, the resource manager 110 can behave aperiodically or periodically, depending on the client request.

The resource manager 110 can communicate with one or more clients and/or the entity through the interface 120. Communication with such components can be through wire and/or wireless technologies. Suitable technologies include technologies based at least in part on radio frequency (RF), infrared (IR), optics, Wi-Fi, Blue-Tooth, Ethernet (e.g., 10Base-T, 100Base-T, and 1000Base-T), Universal Serial Bus (USB), standard serial or parallel communication, etc. In addition, communication can be over a bus and/or network. For example, the resource manager 110 can reside on a bus local to the entity. In one aspect of the invention, the local bus can be a system bus of the entity or a bus residing on a daughter module coupled to a backplane of the entity. In another example, a client can be executing in a machine with the resource manager 110 or in connection with a remote machine. Irrespective, the client can convey communications to the resource manager 110 via a bus, as described above, and/or over a network such a Local Area Network (LAN) or Wide Area Network (WAN) (e.g., the Internet).

It is to be appreciated that the system 100 and, optionally, the remaining systems, methods, etc. (and variations thereof) described herein can be modeled via a process algebra and/or derivation thereof. Examples of suitable process algebra include pi calculus (e.g., asynchronous) and derivations thereof, join calculus and derivations thereof, etc. For example, process algebra can be utilized to represent a communication transmission, a request for processing resources, a reply channel, a communication receiving port, a resource manager, a scheduler, a sequencer, a port service, a processor, an execution context, a location of memory, requested memory, a signal generator, etc. Thus, essentially any programming language can target the system 100 in a more natural way than traditional OS application programming interfaces (APIs). In addition, a programmer can write in a synchronous receive fashion, wherein a compiler can target the novel runtime of the present invention by re writing the synchronous receive code to an asynchronous choice request with a continuation attached.

Figure 2:
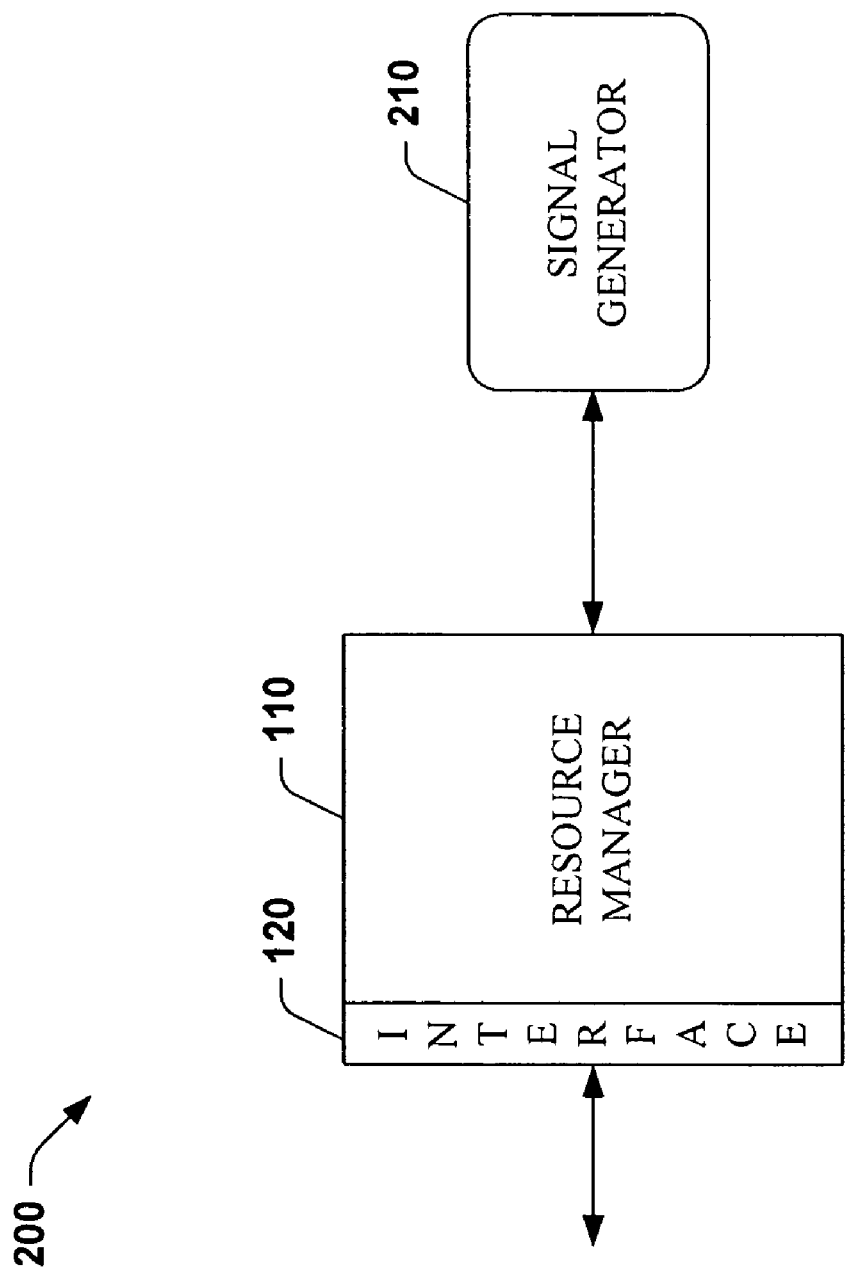
FIG. 2 illustrates an exemplary system that utilizes a signal generator to create a clock that can be utilized to facilitate management of processing resources.

FIG. 2 illustrates a system 200 that can utilize a signal generator to transmit messages (e.g., to provide clocked management of processing resources) for clients that desire periodicity. The system comprises the resource manager 110, the interface 120 and a signal generator 210. In general, the signal generator 210 is like any other process, wherein it can receive and/or generate messages sent on ports. Additionally, it can provide a feature wherein its message generation is periodic. However, this feature can be isolated to that signal generation process and is not enforced by the rest of the system. By interacting with the signal generator 210, client code can utilize the same mechanisms of receiving and/or coordinating between processes and messages. As described in detail above, the interface 120 can be utilized to couple the resource manager 110 to an entity, wherein the resource manager 110 can manage processing resources associated with the entity. Utilizing the resource manager 110 to respond to incoming communications mitigates any need for the entity to utilize a clock to check for communications at some defined frequency.

Although a clock is not required, the resource manager 110 can compose with a clock, if desired. Thus, a client can transmit a communication that includes a request for a clock, along with other information such as resources, an execution context and a reply channel, for example. In one aspect of the present invention, the signal generator 210 can be utilized as a clocking device. For example, the signal generator 210 can be configured to operate at a frequency of one tick per cycle (e.g., one microsecond). With this configuration, the signal generator 210 can be utilized to provide a one-tick clock or a clock executing at multiples thereof. It is to be appreciated that the clock tick is just another message received on a port. This tick can be utilized by a client to issue a timeout. For example, a timeout can be implemented by counting messages or clock ticks. In addition, the clock tick can be utilized to facilitate throttling the utilization of message allocations and, thus, provides a scale invariant technique to control execution.

The frequency of the clock can be varied by piggybacking on a tick (e.g., via join, as described below) until a desired frequency is achieved. For example, rather than transmitting on a first tick, the communication can be delayed until a second tick, for example, simply by counting messages. Thus, the one tick clock essentially becomes a two-tick clock. An N-tick clock, where N is a real number, can be created by counting N−1 messages and transmitting on an Nth tick. Utilizing a join mechanism to implement derivative clocks of various frequencies provides for novel improvements since it allows client code to never have to think about clocks and/or time differently than it does for traditional messages, like the number of responses it received from M (where M is an integer greater to or equal to 1) different remote services. Thus, associating a signal generator with a request for a message and utilizing a join couples resource consumption with some clock signal. Controlling the rate of the signal generator can be through reservations and implementing a hard real-time system. In addition, join can be utilized for message aggregation and/or controlling timeouts based on clock ticks.

In other aspects of the present invention, an occurrence of an event or observed stimuli can act as clocking device (e.g., aperiodic and periodic). For example, a threshold can be associated with a temperature, an action, a state, a condition, etc. and crossing and/or equaling the temperature, action, state, condition, etc. threshold can trigger the resource manager 210 to send a communication. Thus, a client can transmit a communication to the resource manager 210 and include triggering criteria. The resource manager 210 can refrain from transmitting a communication to the client until the criteria is achieved. By way of example, a client can transmit a communication to the resource manager 210 that includes a request for "X" resources and port "Y." The communication can further include a reply channel "Z" and threshold criteria.

The resource manager 210 can receive this information from the communication and determine whether the request can and should be accepted or denied. When the resources and port become available and the criteria is met, the resource manager 210 can send a communication to the reply channel "Z." It is to be appreciated that a temperature threshold was utilized in the foregoing example for explanatory purposes and does not limit the invention. Essentially, the client can define the criteria. In addition, the signal generator 210 and triggering criteria can be utilized in combination such that the resources, port of execution, and criteria are checked based on a clock frequency produced by the signal generator 210.

Figure 3:
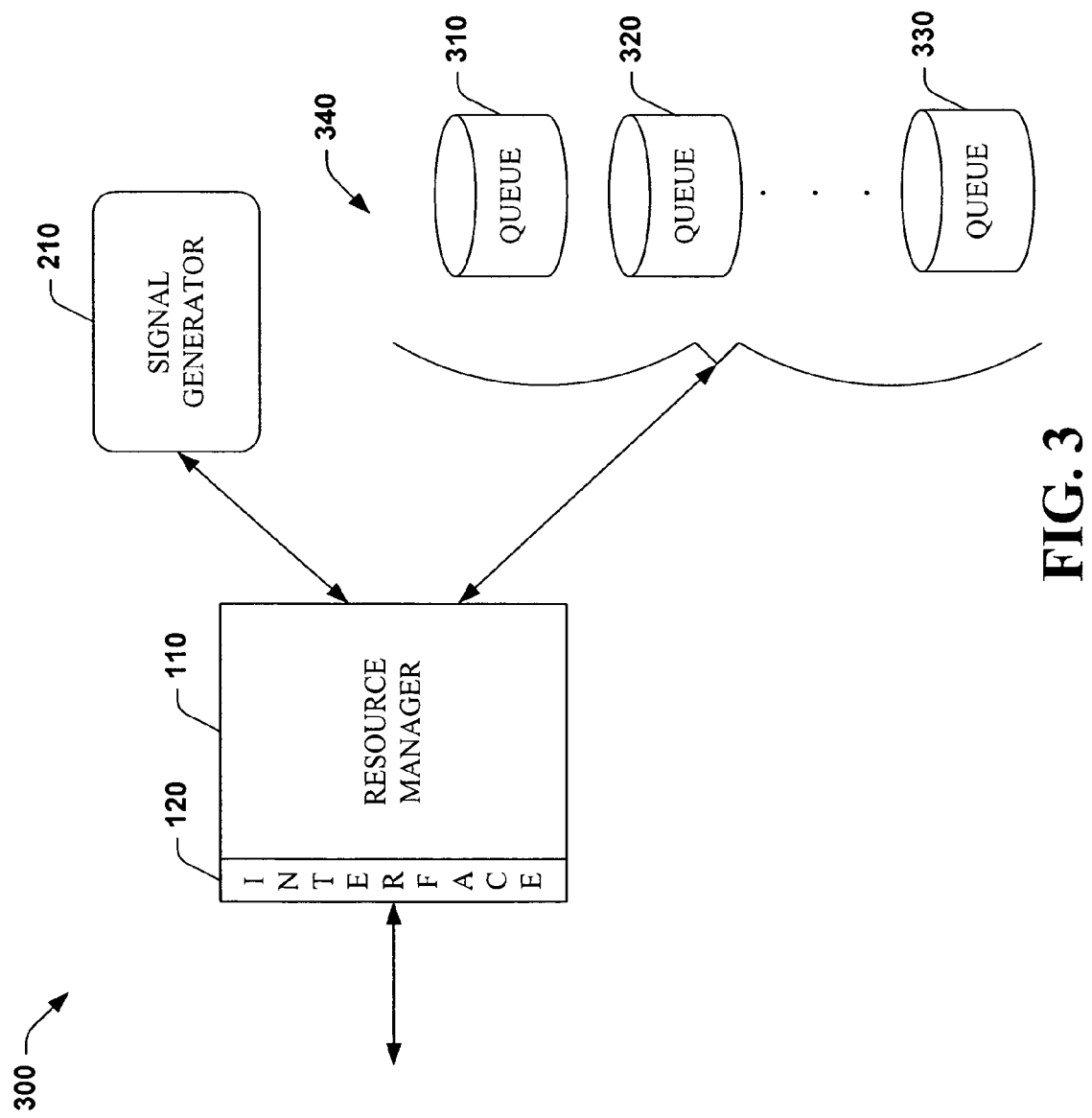
FIG. 3 illustrates an exemplary system that employs queues to facilitate handling messages for processing resources.

FIG. 3 illustrates a system 300 that utilizes a plurality of queues to facilitate communication handling. The system 300 comprises the resource manager 110, the interface 120, the signal generator 210, and a plurality of queues 310-330, collectively referred to hereafter as queues 340. The resource manager 110 can utilize the queues 340 to store incoming communications. For example, in one instance a plurality of communications from one or more clients can be concurrently and/or serially received by the resource manager 110 (e.g., at a port associated therewith). Such communications, as described above, can be received through the interface 120 and include messages, interrupts (IRQs), etc. The resource manager 110 can store these communications in the queues 340. The queues 340 can be configured to provide a priority scheme, wherein communications with high priority information can be stored in a high priority queue (e.g., queue 310) and communications with low priority information can be stored in a low priority queue (e.g., queue 330).

In another example, respective queues 340 can be delineated into regions of different priority. Thus, communications with high priority and communications with low priority can be stored in a similar queue (e.g., queue 320), but in separate regions. In yet another example, the queues 340 can be assigned a priority level and individual queues 340 can further delineate based on priority to provide for greater discrimination resolution. Thus, communications with high priority information can be stored in a designated high priority queue, and the high priority communications stored therein can be further separated based on priority.

The resource manager 110 can scrutinize the queues 340 to determine which communications should be handled prior to other communications. For example, the resource manager 110 can begin by scrutinizing queues designated for high priority communications. If any such communications are located, the resource manager 110 can handle the communications. The resource manager 110 can then scrutinize the queue designated with the next highest priority level and handle any stored communications. This approach can continue until all the queues can be scrutinized and communications requiring service can be handled. In another aspect of the present invention, each time the resource manager 110 checks the queues it can start with the queue designated to the highest priority communications. Thus, after handling any communications in the queue designated to the highest priority communications, the resource manager 110 can scrutinize the next queue. If at least one communication is located, the resource manager 110 can handle the communication. Then, the resource manager 110 can go back and scrutinize the queue designated to the highest priority communications to address any high priority communications that arrived since the queue was last checked for communications. This approach can guarantee that the highest priority communication is handled with each iteration.

The above two examples depict a sample of suitable techniques that can be employed in various aspects of the invention. It is to be understood that essentially any technique can be employed. Typically, a user of the entity can define a particular approach to employ. In some instances, intelligence (e.g., machine learning) can be utilized to facilitate determining a suitable approach. For example, an intelligent component (not shown) can utilize training sets (e.g., explicit and implicit), a rule base, probabilities, inferences, statistics, history logs, user information, etc. to facilitate selecting and/or creating an approach to handling stored communications that considers priority. In still other aspects of the invention, a priority can be indicative of the user, a time of day, a day of the week, a duty cycle, a machine, a bandwidth, a capacity, a current load, processing resources, etc.

Figure 4:
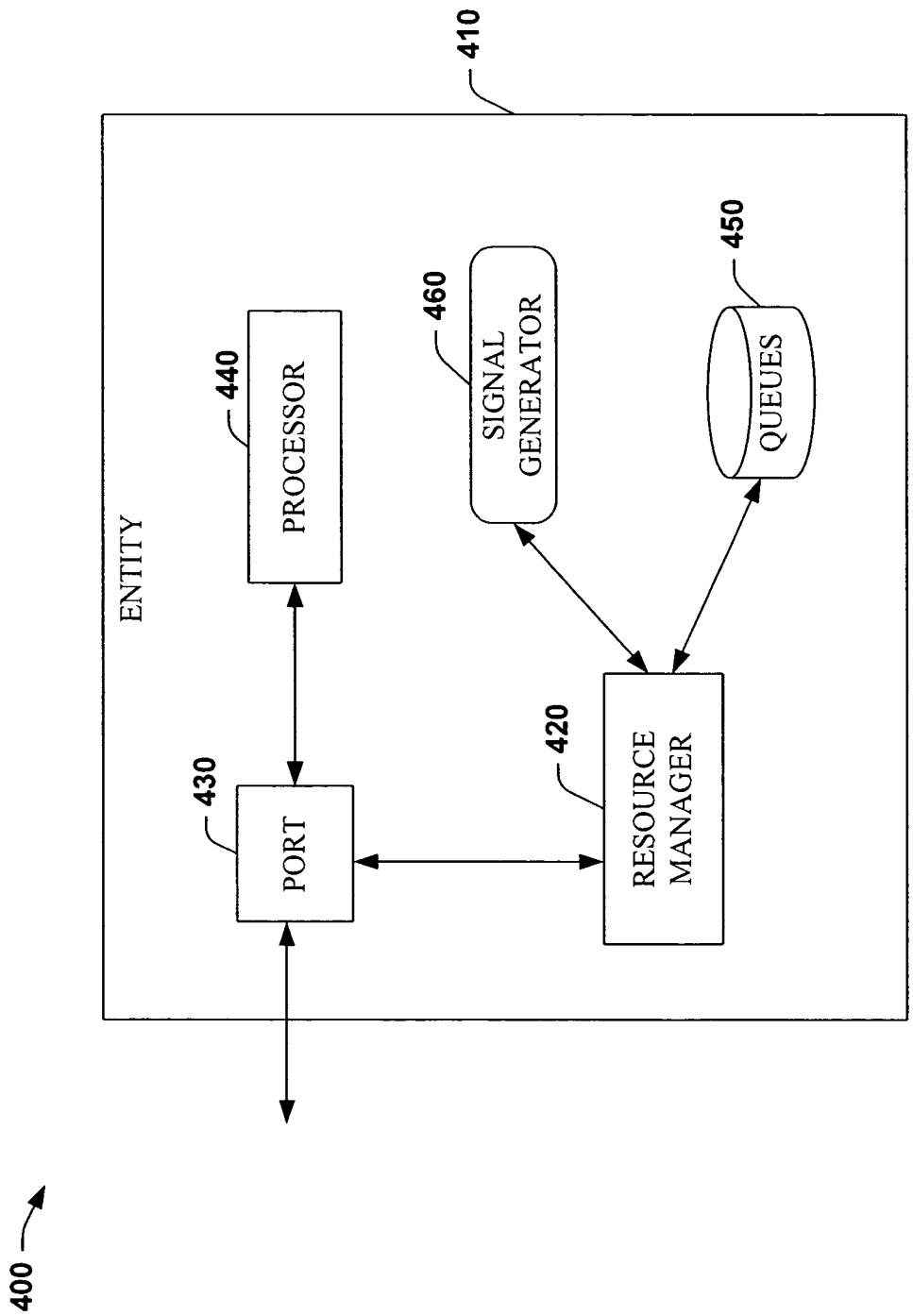
FIG. 4 illustrates an exemplary system with an entity that employs a resource manager to manage its processing resources.

FIG. 4 illustrates a system 400 with an entity that employs a resource manager to manage its processing resources. The system 400 comprises an entity 410 with a resource manager 420. The resource manager 420 can facilitate distributing the processing resources of the entity 410 to clients requesting such resources and coordinating utilization of these resources. As depicted, the resource manager 410 can listen on a port 430 of the entity 410. In general, the entity 410 can utilize one or more processors, wherein each processor can be associated with a context of execution. In addition, respective processors typically are associated with at least one port and respective ports can be associated with at least one resource manager (e.g., the resource manager 110 of FIGS. 1-3 and the resource manager 420). The entity 410 is depicted with a processor 440 associated with the port 430 and the resources manger 420.

Clients can request processing resources from the entity 410 by transmitting a request to the port 430. The request can include a request for a particular amount (e.g., a range) of memory, a request to execute in the context of the entity 410, whether a clock is desired, triggering criteria (if any), a request for a continuation, and a reply channel. As noted previously, a request can be received as a stream, a burst(s) and/or a data packet(s), wherein the contents is compressed, encrypted, encoded, modulated, encapsulated within an envelope, etc. Upon transmitting such request, the client can stop executing and its context of execution can be reused for another process. When suitable processing resource are allocated, the client can utilize the allocated resources to being or continue processing a task.

The resource manager 420 can receive this request, as well as other requests (e.g., IRQs, etc.), through the port 430. Received requests can be stored in the queues 450, for example, based on a scheme that considers priority, preferences, rules, etc., as described in detail above. It is to be appreciated that the scheme utilized can consider any combination of the foregoing information, as well as the information. When utilizing multiple bins of information (e.g., a priority consideration bin, a preference consideration bin, a rules consideration bin, etc.), various weighting techniques (e.g., linear and non-linear) can be utilized by a user to bias the resultant criteria. Upon classifying the request (e.g., high priority), the resource manager can store the request in the queues 450.

The resource manager 420 can search the queues 450 and transmit replies via specified reply channels. The order in which requests are handled can be determined by the entity 410 or user thereof. For example, the resource manager 420 can respond to requests based on a priority associated with the request and/or a priority assigned to the request. The resources manger 420 can search the queues 450 and the requests stored therein to determine such information. In addition, intelligence (as described herein) can be employed to facilitate any decisions.

When handling a particular request, the resource manager 410 can determine whether the processing resources are available, and the resource manager can transmit a communication to the specified reply channel, wherein the communication can include a link (e.g., name, alias, address, etc.) to allocated resources. The execution context of the processor 440 can be reserved and the task associated with the request can be executed by the processor, within its execution context. In one aspect of the invention, the processing resources can be granted such that the processing resources can be locked until the task is complete. In other instances, execution can be halted and the processing resources can be released when a predefined event occurs. For example, if a higher priority communication such as an error message is received, execution can be paused or terminated. If or when the resources and execution context become available again, execution can resume from where it was paused or re-start. In another example, the task can require execution of a second task, wherein the execution context is provided to the second task for execution and then returned to the original task.

In circumstances where the resource manager 420 determines that it will not provide the requested processing resources, the resource manager 420 can preempt the request. Thus, the entity 410 can determine which clients can utilize its execution context, the quantity of processing resources it is willing to provide to a client, how long it will allow its processing resources to be utilized to execute a task, etc. In addition, preemption can be utilized when the requested processing resources are greater than the entity 410 can provide.

In yet other aspects of the present invention, a signal generator 460 can be utilized to restrict access to the processing resources. For example, in order to preempt a request and prevent any task from indefinitely consuming processing resources, the signal generator 460 can be utilized to release the execution context of the processor 440 after a predetermined time (e.g., a cycle or multiple thereof). The signal generator 460 can further provide a clocking mechanism for any request that specifies a clock is desired for periodicity.

Figure 5:
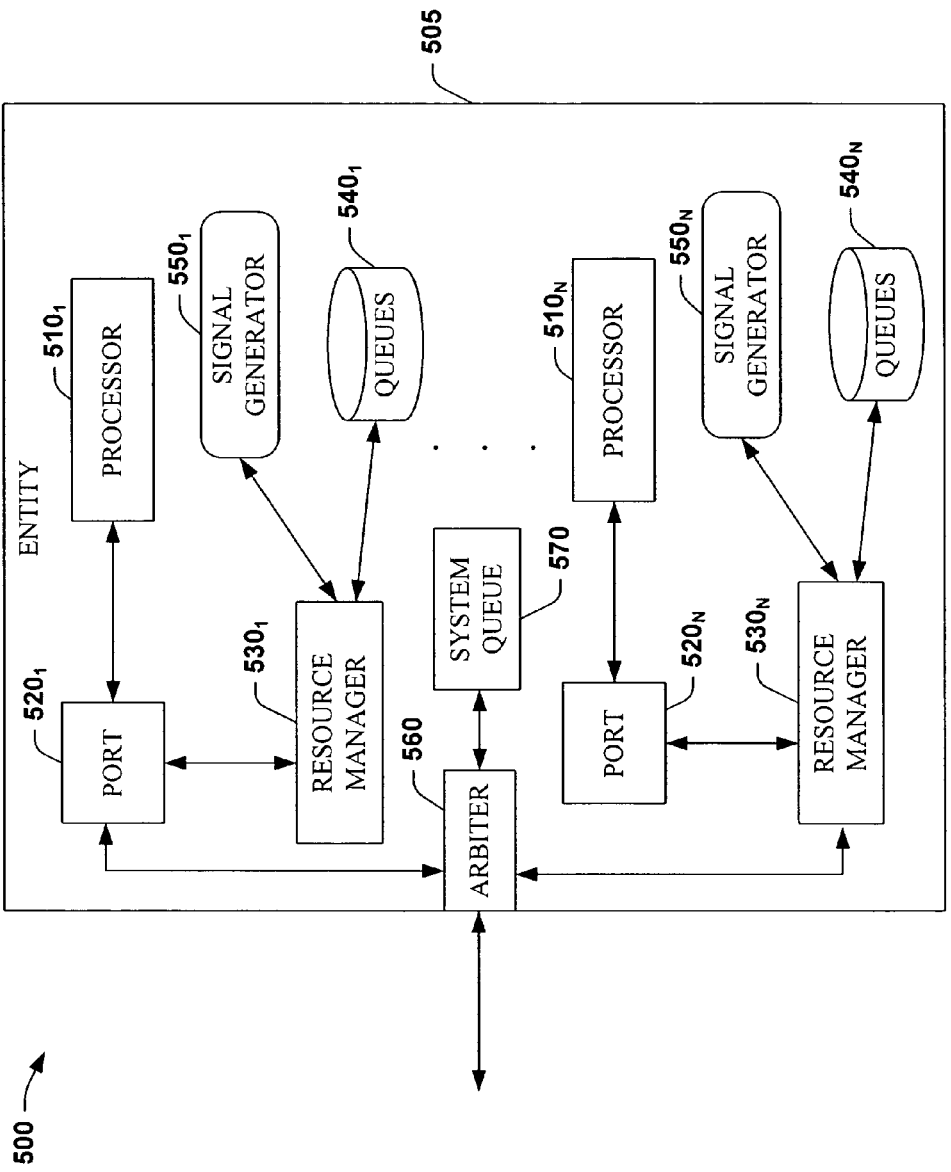
FIG. 5 illustrates an exemplary system with a multiprocessor entity that utilizes multiple resource managers to manage processing resources for respective processors.

FIG. 5 illustrates a system 500 with a multiprocessor entity 505, wherein respective processors utilize a resource manager to manage respective processing resources. The system 500 comprises a processor $510_1$ through an Nth processor $510_N$ (collectively referred to as processors 510), wherein N is an integer greater than or equal to one. Respective processors of processors 510 can be associated with a port $520_1$ through an Nth port $520_N$ (collectively referred to as ports 520), and respective ports of ports 520 can be associated with a resource manager $530_1$ through an Nth resource processor $530_N$ (collectively referred to as resource managers 530). Resource managers 530 listen for and handle incoming messages on respective ports 520. Resource managers 530 can further be associated with a queue $540_1$ through an Nth queue $540_N$ (collectively referred to as queues 540) and a signal generator $550_1$ an Nth signal generator $550_N$ (collectively referred to as signal generators 550). As described in detail above, queues can be utilized to facilitate request handling be providing a mechanism to separate requests based on priority and store request for later handling. In addition, the signal generators 550 can provide a mechanism to compose with a clock and preempt consumption of processing resources.

The system 500 further includes a message arbiter 560 (e.g., an allocated dispatching port) that receives incoming messages and facilitates conveying messages to respective ports 520. In one aspect of the invention, a received message can include a request for a particular execution context. The message arbiter 560 can determine whether the message specifies an execution context associated with a particular processor or any execution context of the entity 505. The message arbiter 560 can employ various techniques to determine which of the processors 510 should be utilized to service the request. In one example, if a particular execution context is specified, the message arbiter 560 can forward the message to the corresponding port or store the message in the system queue 570.

A stored message can be retrieved or conveyed to the appropriate port at a later time. For example, a messages directed to port $520_1$ can be stored in the system queue 570. Examples of situations where such storage can occur includes instances where the resource manager $530_1$ rejects the message, the resource manager $530_1$ is unavailable, the resource manager 530₁ is inoperable, and the request includes information stating the message should be stored in the system queue 570. In another example, the message may not specify an execution context. In these instances, the message arbiter 560 can forward the message to an available port or store the message in the system queue 570. For a stored message, when a port becomes available, the message can be conveyed to a port or a resource manager associated with the port can retrieve or request the message.

The message arbiter 560 can additionally be utilized to provide security for the entity 505. For example, the message arbiter 560 can scrutinize the content of a message to determine a valid port and processor are identified, whether requested resources are within an authorized set of resources, whether an item of execution (e.g., a task) is valid, etc. In one instance, an item of execution can be compared with a database (e.g., a reserved section of the system queue 570, an external common database, etc.) of known malicious tasks or known valid tasks. In another example, a probability and/or confidence level can be utilized wherein the entity 505 can determine a level of risk it is willing to accept.

Figure 6:
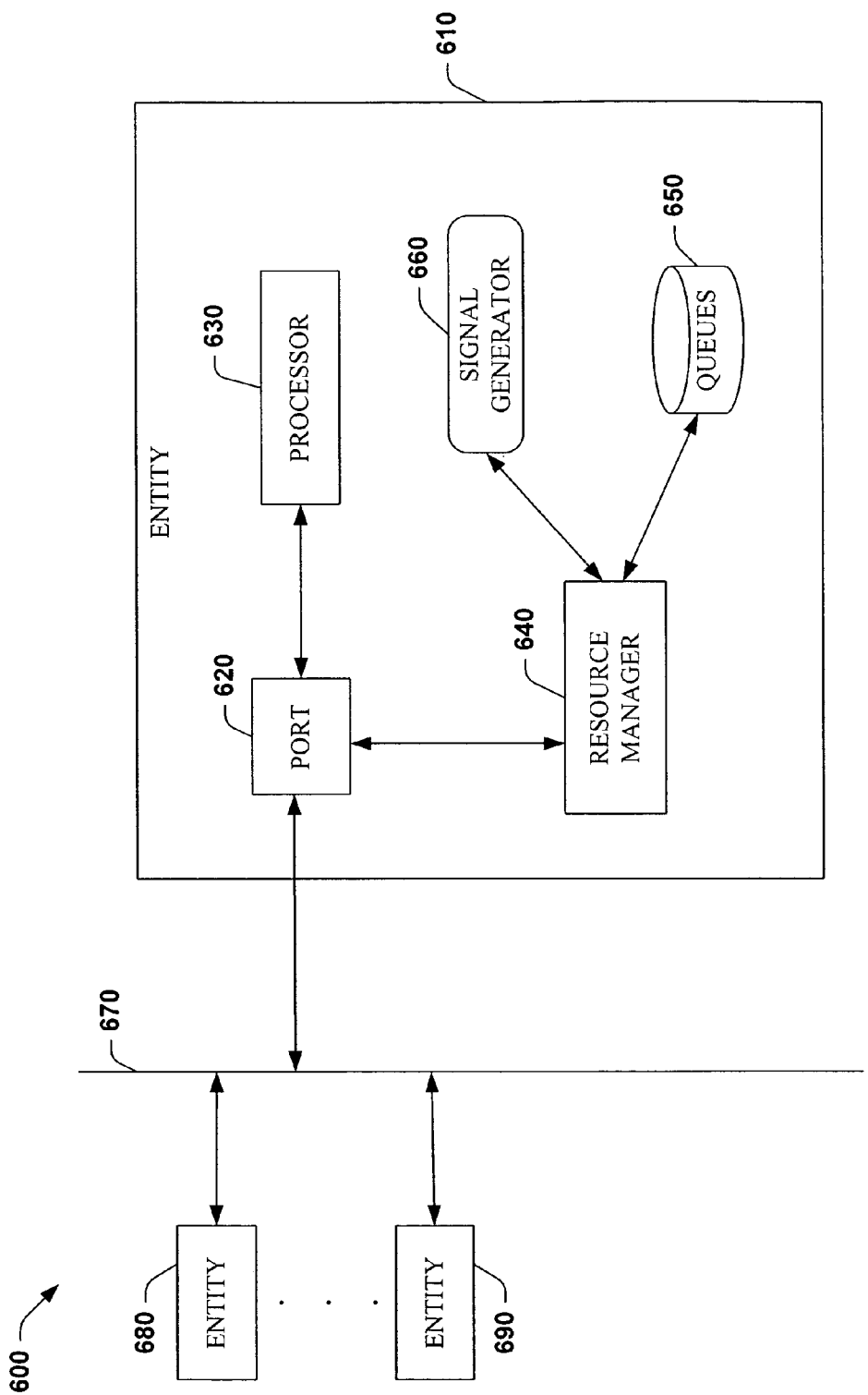
FIG. 6 illustrates an exemplary system with a plurality of entities that employ respective resource managers to manage processing resources.

FIG. 6 illustrates a system 600 wherein a plurality of entities executing similar and/or disparate OSs and employing respective resource managers and associated components (as described herein) on top of the OSs communicate amongst one another through sending messages. The system 600 comprises an entity 610 the can employ a free running (e.g., clock independent) OS. It is to be appreciated that the entity 610 can be substantially similar to the entities described above (e.g., entity 410 (FIG. 4) and 510 (FIG. 5)). The system 600 includes an allocated port 620 associated with a processor 630, a resource manager 640 that listen behind the port 620 for communications, a queue 650 that can be utilized to store received communications, and a signal generator 660 that can be utilized to optionally establish a clocking mechanism.

The system 600 further comprises a communication network 670 (e.g., wire or wireless) and a plurality of entities 680 through 690, which can be similar to the entity 610. At least one of the plurality of entities 680 through 690 can be a component with an item of execution. Such component can transmit a request to the port 620. As described previously, the request can include requested resources, a request for the execution context, a request for a clock, message triggering criteria, a reply channel, etc. The entity 610 can reside in a "free running" state wherein the processor 630 does not expend any processing resources, for example, to check for requests based on a clock cycles. Instead, the resource manager 640 can receive requests at the port 620. Upon receiving a request, the resource manager 640 can allocate at least a portion of memory 695 and provide the context of the processor 630 to execute the item. If the request includes a request for a clock, the resource manager 640 can employ the signal generator 660 and periodically (e.g., based on communication transmissions), provide the allocated memory and the execution context to the reply channel when the resources and context are available or terminate execution.

FIGS. 7-10 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Figure 7:
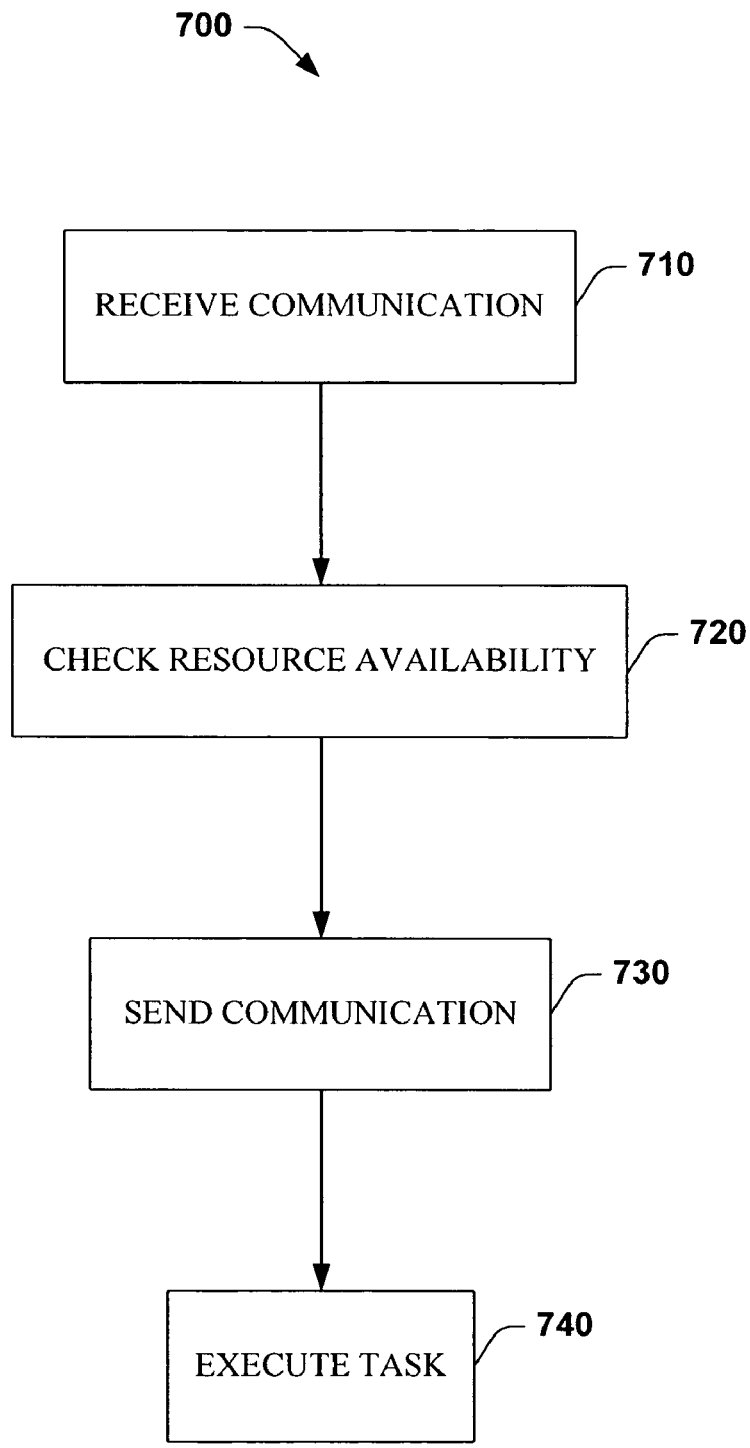
FIG. 7 illustrates an exemplary methodology that utilizes a resource manager to manage processing resources.

FIG. 7 illustrates a methodology 700 that manages processing resources. At reference numeral 710, a communication is received. The communication can be a request for processing resources (e.g., to execute code, manipulate data, read/write data, etc.), an interrupt, a message, data, etc. Typically, the communication is received at a port, wherein such port is associated with an entity with processing resources. As described supra, such an entity can utilize a plurality of processors (e.g., a multiprocessor computer) that process (e.g., execute instructions, etc.) data. Generally, individual processors are associated with respective ports and each port is associated with a resource manager that listens for communications behind the port.

When a communication is received at the port, the resource manager determines the purpose of the communication, for example, whether it is a request for processing resources, whether it is an interrupt request, etc. As described supra, the communication can be delivered as a stream, a burst(s) and/or a data packet(s). In addition, the communication can be compressed, encrypted, encoded, modulated, encapsulated within an envelope, etc. Where multiple communications are concurrently received, one or more communications can be stored in a storage bank. It is to be understood that concurrent as utilized here can refer to simultaneous reception of one or more communications, delayed receptions with at least partial overlap, and separate receptions wherein a second communication arrives prior to completely handling a first reception. The communication can be stored in a first-in-first-out (FIFO), first-in-last-out (FILO), random, or a prioritized manner, for example. The technique in which the communications are handled can vary. For example, in one instance communications can be handled based on importance as indicated by a priority level.

If a communication includes a request for processing resources, information from the communication (e.g., a quantity and type of processing resources, an execution context, indicia indicating whether clocked communication is desired, a reply channel, as well as other information) can be obtained. At reference numeral 720, the availability of the processing resources is determined. If the processing resources are not available, the communication can be queued or denied until such processing resources are available. If the processing resources are available, at 730 a communication can be transmitted to a reply channel specified in the request. This communication can include the location of reserved resources (e.g., a pointer, an address, etc.) and access to a processor. At 740, the processor can be utilized to execute a continuation (e.g., an item of execution, a task, etc) associated with the request.

It is to be appreciated that the foregoing method enables the entity to operate in a "free running," clockless mode, wherein the processor is not utilized to periodically (e.g., base on a clock) check for communications. Rather, the processor can transition to an idle state and the resource manager can handle communications. In addition, the resource manager can selectively allocate resources, which provides a mechanism to account for processing resources, preempt requests for processing resources, and limit the processing resources utilize at any given time, for example. However, it is also to be appreciated that a clocking mechanism can be utilized when specified in a request as described herein. Moreover, it is to be appreciated that process algebra (as described herein) can be utilized to model some or all acts and associated actions with the methodology 700 as well as the remaining systems, method, etc. described herein.

Figure 8:
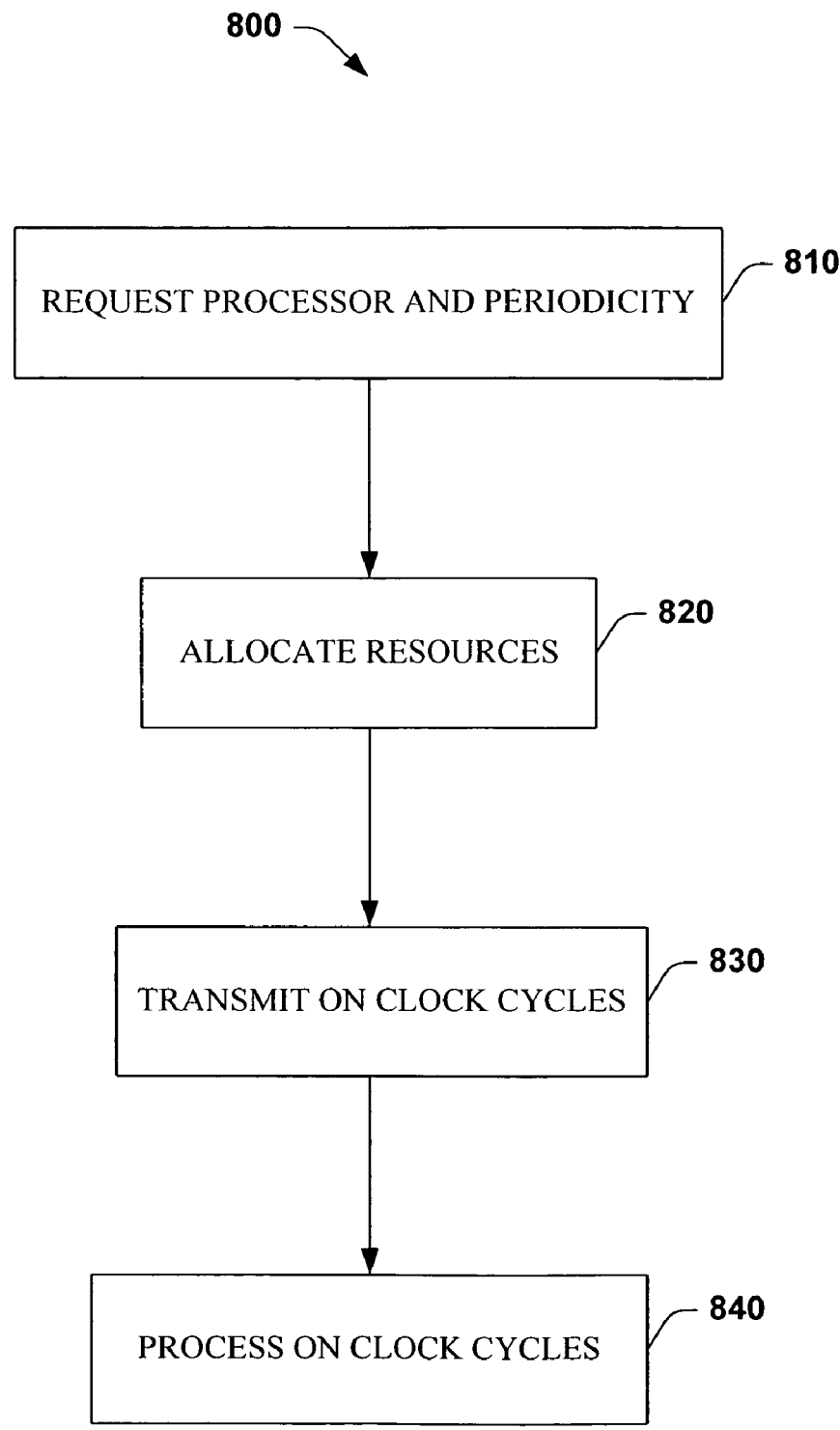
FIG. 8 illustrates an exemplary methodology that employs a signal generator to facilitate managing processing resources.

FIG. 8 illustrates a methodology 800 that utilizes a signal generator to provide clocked management of processing resources. At 810, a request for an execution context and clocked communication is received at a port of a processor of an entity. The entity can be executing in a "free running" state, wherein processing cycles are not regularly consumed to check for incoming communications or perform other periodic tasks. The request arriving at the port can be received by an associated resource manager.

At 820, the resource manager can retrieve information from the request and allocate processing resources based on the information. As described herein, the processing resources can include memory and an execution context, for example. In response to the request for a clock, a signal generator can be utilized to create a clock. By way of example, the signal generator can be configurable such that its frequency can be defined. This can be achieved by associating the signal generator with a request for a message and utilizing a join to couple resource consumption with some clock signal. Controlling signal generator rates (e.g., which are allocated like any other resource) can be considered an approach that utilizes reservations and through potentially implementing a hard real-time system. It is to be appreciated that the signal generator can receive and generate messages sent on ports similar to other processes. By interacting with the signal generator, the client code can be utilized similar mechanisms of receiving and coordinating between processes and messages.

In one example, the frequency can be set to one tick per cycle. With this configuration, an M tick clock (where M is an integer greater to or equal to one) can be constructed by utilizing joins to delay a response until the Mth tick by counting messages. This clock can provide periodicity where requested. In other aspects of the present invention, an event and/or observed stimuli can be utilized to facilitate clock generation. For example, a threshold temperature, action, state, condition, etc. can be specified, wherein crossing and/or equaling the threshold can be analogous to a tick and trigger the response. The threshold can be utilized to create the M tick clock, via joins, to delay the response until the Mth trigger, or the Mth time the threshold is reached. This clock can provide periodicity or aperiodicity, depending on the frequency in which the threshold is reached. It is to be appreciated that various combinations of time-based and threshold-base, as well as other techniques, can be utilized to create a desired clock.

At reference numeral 830, communications can be transmitted based on the signal generator. For example, a communication can be transmitted on the Mth tick. In another example, a communication can be transmitted when the threshold is reached or the Mth threshold is reached. In yet another example, a communication can be transmitted after a clock cycle (or Nth clock cycle) and the threshold (or Mth threshold) is reached. The communication can include the location of allocated memory and the execution context. At 840, the context can be utilized to execute a task. It is to be appreciated the clock can be utilized to terminate (e.g., preempt) a task in execution. For example, a higher priority request can be received which elicits a preemption of a presently executing task. In another example, the processing resource can be shared to execute other task, wherein each task is provided with the processing resources for a limited number of clock cycles. When the limit is reached, a communication can be transmitted which transfers the processing resources for another task.

Figure 9:
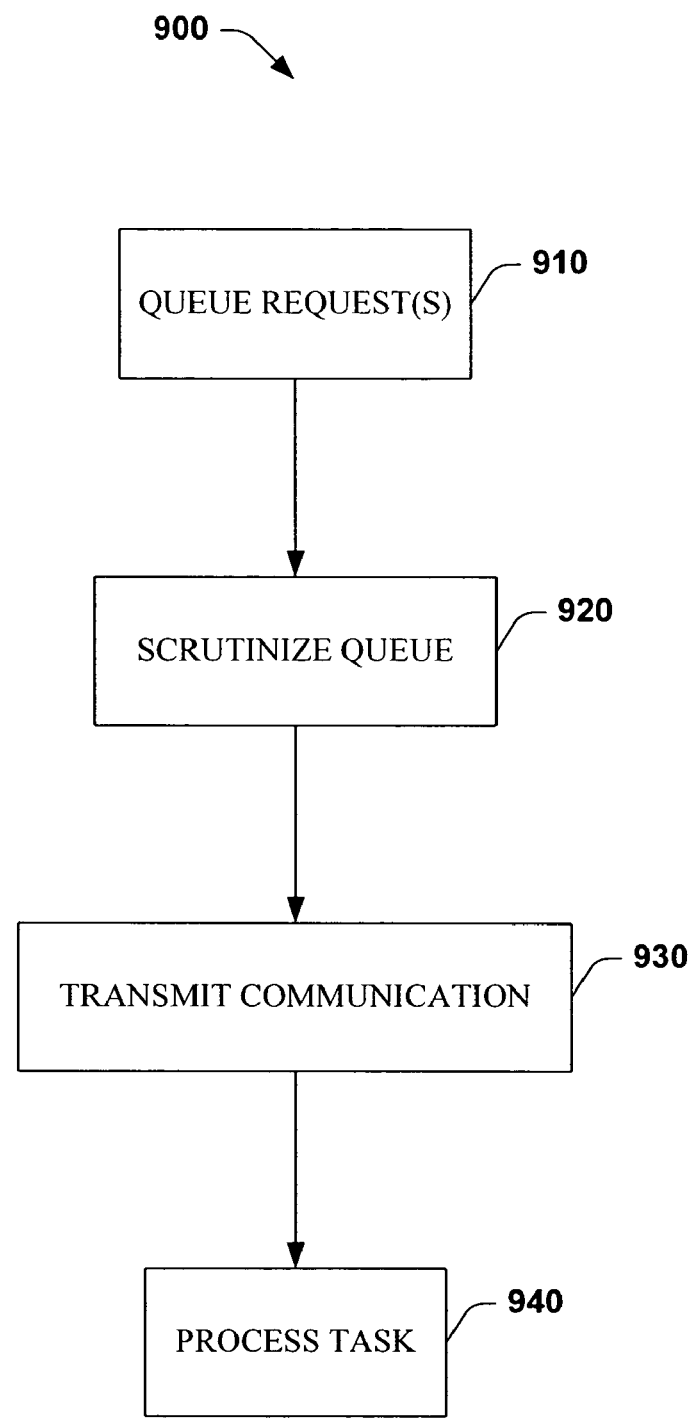
FIG. 9 illustrates an exemplary methodology that employs a prioritization technique to facilitate distributing processing resources.

FIG. 9 illustrates a methodology 900 that manages processing resources for one or more requests. At reference numeral 910, a plurality of requests for an execution context is concurrently or serially received at a port of a processor and queued by an associated resource manager that handles received requests and distributes processing resources of the processor. At reference numeral 920, the resource manager scrutinizes the queues for requests. It is to be appreciated that respective queues can be associated with a priority level (e.g., high, medium, low, etc.) and that the resolution of the priority can be variously defined. Thus, as requests arrive, respective requests can be superficially and/or intensely analyzed and accordingly stored in a queue representative of its priority. In addition, requests stored in a similar queue can be further delineated based on priority. Thus, high priority requests can be stored in corresponding queues and locations within queues, medium priority requests can be stored in corresponding queues and locations within queues, etc.

The resource manager typically scrutinizes queues based on priority. Thus, high priority queues can be scrutinized before low priority queues or vice versa. Likewise, scrutiny within a queue can be based on priority. Typically, requests within a high priority queue are handled before scrutinizing a lower priority queue. In addition, higher priority queues can be rechecked from time to time to determine whether a high priority request arrived while handling requests in the lower priority queue. In another aspect of the invention, a notification can be provided to the resource manager when a high priority request arrives, wherein the resource manager can continue handling the request or begin handling the high priority request. In still other aspects of the invention, the priority can be additionally or alternatively indicative of one or more of the user, a time of day, a day of the week, a duty cycle, a machine, a bandwidth, a capacity, a current load, processing resources, etc.

Upon locating a request to handle, the contents of the request can be observed to determine what processing resources are requested, obtain a reply channel, etc. At reference numeral 930, a communication can be transmitted to the reply channel, wherein the communication can include a pointer to allocated processing resources. As noted previously, the reply can be associated with a clocking mechanism (e.g., a signal generator, an event, etc.), wherein the clock can determine when the reply can be transmitted, or transmitted when the processing resources become available. At 940, the processing resources can be utilized to execute a task associated with the request.

Figure 10:
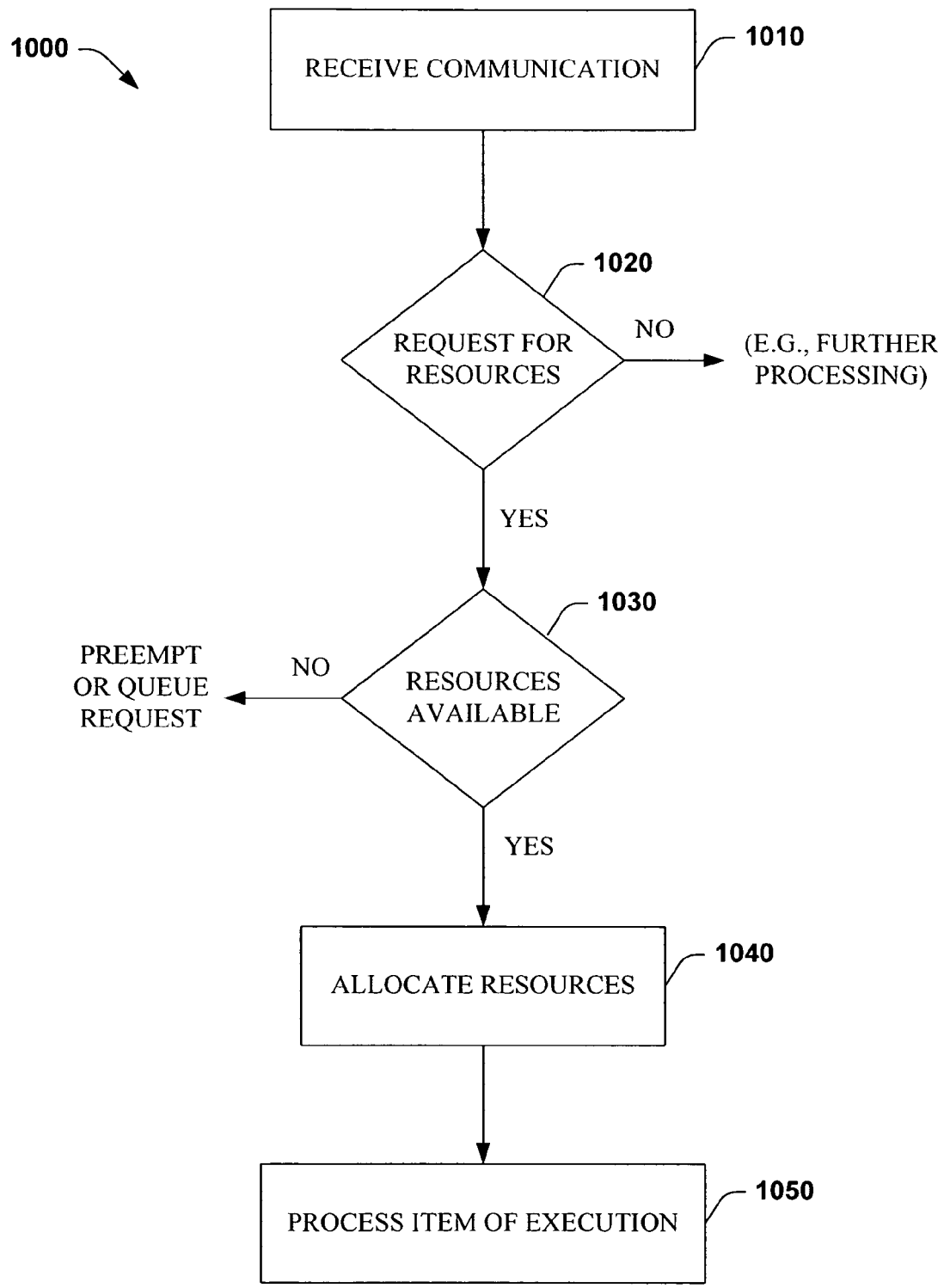
FIG. 10 illustrates an exemplary methodology that provides a mechanism to preempt requests for processing resources.

FIG. 10 illustrates an exemplary flow diagram to preempt requests for processing resources. At 1010, a communication is received at a port. The communication is analyzed to determine whether it includes a request for processing resources (e.g., memory, a processor, etc.) associated with the port. If not, at 1020 the communication can be conveyed to an appropriate component for further processing. If the communication does include a request for processing resources, then at 1020 it is determined whether the processing resources associated with the port are sufficient to fulfill the request. If not, at 1030 the request can be preempted or queued for later handling. If the requested processing resources are available, then at 1040 the processing resources can be allocated and a message providing access to memory and a processor can be sent to the specified reply channel. At 1050, the processing resources can be utilized to process an item of execution associated with the request.

The following sections provide various examples of calculus and/or other representations that can be employed to facilitate modeling the novel aspects of the subject invention and/or an operating system based on the novel aspects of the present invention. One of ordinary skill in the art would recognize that the following examples do not limit the invention and that alternative and/or additional calculus can be employed in accordance with an aspect of the present invention. Examples of suitable calculus include pi (including asynchronous and join calculi and derivations thereof.

Such calculus can be utilized to define a set of named procedures, wherein respective procedures can accept a formal argument and include one or more send statements. For example, u, x can be defined to range over variable names and X, Y can be defined to range over procedure names. A send statement u<x> can be defined to send data x over port u, wherein a sequence of statements can be defined as $S::=\bar{u}_1<x_1>,\ldots;\bar{u}_n<x_n>$ and a procedure definition can be defined as $DEF::=X(y)=S$. The notation C can be utilized to represent instructions for a set of named procedure definitions, for example, where no procedure name is defined more than once. When one or more instructions are executed (e.g., at runtime), there can be one or more threads of execution and some program state, which can include a set of work units, each of which is a SEQ; and a set of named ports, each of which includes either a set of variable names $\tilde{x}$ or a set of procedure names $\tilde{X}$.

An exemplary port (t) can be configured to collect clock ticks. Data into such port can be in the form of $D::=\tilde{x}|\tilde{X}$ and a collection of such ports can be defined as $P::=u_1D_1,\ldots u_nD$, and $P\leftarrow u.D'$ can be utilized to replace u.D with u.D' (e.g., if u already existed) or for adding u.D to P (e.g., if it didn't). The threads of execution can take work units either from the collection of work units or from the network. For example, they can go through the sequence of sends inside the work unit and, accordingly, alter the set of P or create new work units as detailed below.

In another example, respective work units can be considered as autonomous agents that perform sends. A central party can receive these send commands and act accordingly. This state, which can be similar to P above, is a state of the central manager. The central manage can be represented as $\boxed{P}$ for a current state P. The overall state of the system can then be written as $STATE::=\tilde{S}|\boxed{P}$ for a set S of outstanding work units and a central manager. The central manager can behave like a state machine and, thus, it can be represented in a language L. The following is a sample of exemplary commands that can be utilized with such a language: u(z).L can receive a message from a work unit; $u_1(z_1).L_1+u_2(z_2).L_2$ can be utilized as select command; vz can allocate a fresh port name z; and parallel S|L can spawn a new work unit. An if/then command can be represented a left brace. $\boxed{P}$ can be defined as the following:

$$\boxed{P} = \sum_{u\cdot\tilde{x}\in P} u(z)\cdot t(\,)\cdot \boxed{P\leftarrow u\cdot z\tilde{x}} + \sum_{u\cdot Z\tilde{x}\in P} u(z)\cdot t(\,)\cdot \left(S\{z/y\}\,|\,\boxed{P\leftarrow u\tilde{X}}\right)$$

$$\text{for } Z = (y)S \text{ in } C + \text{new}(Z)\cdot t(\,)\cdot vz\cdot (S\{z/y\}\,|\,\boxed{P\leftarrow z\cdot\phi})$$

$$\text{for } Z = (y)S \text{ in } C + rcv(u,Z)\cdot t(\,)\cdot \left[S\{z/y\}\,|\,\boxed{P\leftarrow u\cdot\tilde{x}}\right] \text{ if } u\cdot zx\in P,$$

$$\text{for } Z = (y)S \text{ in } C \text{ or } \boxed{P\leftarrow U\tilde{X}} \text{ if } u\cdot X\in P$$

The system can perform computational steps, wherein a computational step can transition the system from one state to another. Exemplary suitable computational steps include the following: send data: $\bar{u}<x>.S,\tilde{S}|u(Z).L+L'\rightarrow S,\tilde{S}|L\{x/z\}$; send procedure name: $\bar{u}<X>.S,\tilde{S}|u(Z).L+L'\rightarrow S,\tilde{S}|L\{X/Z\}$; and clock tick: $\tilde{S}$ $$\boxed{P,t\cdot\tilde{z}} \overset{t(x)}{\rightarrow} \tilde{S}\,|\,\boxed{P,t\cdot x\tilde{z}},$$

for example. The step labeled $$\overset{t(x)}{\rightarrow}$$

typically only can take place when a system clock provides a tick, whereas the other steps commonly occur at any time. In one aspect of the invention, C can include MAIN(z)=S and can be executed with the central manager: $\{\text{new, rcv/z}\}\boxed{t.0}$ The pi calculus (without recursion or summation for the time being) can be define to include the following: parallel branches: $R::=P|R|0$ and pi program $P::=vx.R|\bar{u}<x>|u(y).R$. This can be alternatively represented, where $X(y)=S_1$ in $S_2$ for taking $X(y)=S_1$ to be defined in C, as $[vy.R_1|R_2]=$ let $X(y)=[_1]$ in $\overline{\text{new}}<x>;[R_2];[\bar{u}<X>|R]=\bar{u}<x>;[R];$ and $[u(y).R_1|R_2]=$ let $X(y)=[R_1]$ in $\overline{\text{rcv}}<x>;[R_2]$.

The following pseudo instructions provide examples of various computer-implemented instructions that can be employed to facilitate implementing the novel aspects of the subject invention and/or an operating system based on the novel aspects of the present invention. These instructions include instructions related to a resource manager, a port service, a scheduler, a sequencer, a signal generator, and an implementation of join/choice. It is understood that one of ordinary skill in the art would recognize that essentially any programming language (e.g., C-based languages) can be utilized to provide such instructions and that additional and/or alternative instructions can be employed in accordance with an aspect of the present invention. Thus, subsets of and modifications, alterations and/or additions to the following instructions can be employed in accordance with an aspect of the present invention.

The following computer implemented instructions can be utilized to provide a resource manager.

```
{
internal class SchedulingAllocations
{
    public readonly Hashtable htSchedulers = new Hashtable( );
    public int numExecutionUnits = 0;
}
internal class MessageAllocationContext
{
    public MessageAllocationContext(Type msgType,int msgCount)
    {
        AllocationType = msgType;
        AllocationCount = msgCount;
    }
    public readonly Type AllocationType;
    public readonly int AllocationCount;
}
internal class MessageAllocations
{
    public readonly Hashtable htMessagePools = new Hashtable( );
}
internal class ResourceManager
{
    PortCollection m_Main = new PortCollection(
```

```
            typeof(SchedulingAllocations),
            typeof(MessageAllocations),
            typeof(AllocationResourceType),
            typeof(msgAllocateSchedulingResource),
            typeof(msgAllocateMessageResource),
            typeof(msgAllocateSignalSource),
            typeof(msgFreeResource));
   IPortCollection m_PrivateScheduler;
   IPortCollection m_SignalSource;
   public ResourceManager( )
   { }
   internal PortCollection Init( )
   {
      Scheduler s = new Scheduler( );
      m_PrivateScheduler = s.Init(2,10,"ResourceManager");
      if (m_PrivateScheduler == null)
         return null;
      SchedulingAllocations allocTable = new SchedulingAllocations( );
      allocTable.htSchedulers.Add(m_PrivateScheduler,s);
      MessageAllocations messageAllocTable = new
      MessageAllocations( );
      m_Main.RegisterReceiver(typeof(msgAllocateSchedulingRe-
source),
         new Schedule(AllocateScheduling),
         m_PrivateScheduler);
      m_Main.RegisterReceiver(typeof(msgAllocateMessageResource),
         new Schedule(AllocateMessage),
         m_PrivateScheduler);
      m_Main.RegisterReceiver(typeof(msgAllocateSignalSource),
         new Schedule(AllocateSignalSource),
         m_PrivateScheduler);
      m_Main.RegisterReceiver(typeof(msgFreeResource),
         new Schedule(Free),
         m_PrivateScheduler);
      m_Main.Post(allocTable);
      m_Main.Post(messageAllocTable);
      Sequencer seq = new Sequencer( );
      m_SignalSource = seq.Init(m_PrivateScheduler);
      return m_Main;
   }
   void Free(object M)
   {
      msgFreeResource msg = (msgFreeResource) M;
      Scheduler s = null;
      AllocationResourceType t =
(AllocationResourceType)msg.Resource.Get(typeof(AllocationRe-
sourceType));
      switch (t)
      {
         case AllocationResourceType.SignalGenerator:
            msg.Resource.Post(t);
            break;
         case AllocationResourceType.Message:
            MessageAllocations mAllocTable = (MessageAllocations)
            m_Main. Get(typeof(MessageAllocations));
            try
            {
               MessageAllocationContext context = (MessageAllocation
Context)
                  msg.Resource.Get(typeof(MessageAllocationContext));
mAllocTable.htMessagePools.Remove(context.AllocationType.Assem-
blyQualifiedName
);
               IPort portPool = msg.Resource.GetPort(context.Alloca-
tionType);
               for (int i=0;i<context.AllocationCount;i++)
               {
                  msgResourceManagerBase o =
(msgResourceManagerBase)portPool.Test( );
                  if(o ==null)
                  {
                     throw new Exception("ResourceManager:FreeRe-
                        source:Detected
   resource leak in message pool for type:"+context.AllocationType);
                  }
                  o.bAllocationPoolDisposed = true;
               }
            }
            finally
            {
               m_Main.Post(mAllocTable);
            }
            break;
         case AllocationResourceType.Scheduling:
            SchedulingAllocations allocTable = (SchedulingAllocations)
               m_Main.Get(typeof(SchedulingAllocations));
            try
            {
               string strInUse= null;
               s = (Scheduler)allocTable.htSchedulers[msg.Resource];
               if (s!=null)
               {
                  strInUse = (string) s.portDispatcher.Test(typeof(string));
                  if (strInUse == null)
                  {
                     allocTable.htSchedulers.Remove(msg.Resource);
                     allocTable.numExecutionUnits -= s.ThreadCount;
                     Debug.WriteLineIf(TS.Core.TraceVerbose,
                        "ResourceManager.Free: Total Execution
Units:"+allocTable.numExecutionUnits);
                     if(s!=null)
                        s.Shutdown(new msgShutdown( ));
                  }
               }
            }
            finally
            {
               m_Main.Post(allocTable);
            }
            break;
      }
   }
   void AllocateSignalSource(object M)
   {
      msgAllocateSignalSource msg = (msgAllocateSignalSource)M;
      msg.ResultPort.Post(new msgAllocateResourceResult
         (m_SignalSource));
   }
   void AllocateScheduling(object M)
   {
      msgAllocateSchedulingResource msg = (msgAllo-
         cateSchedulingResource) M;
      SchedulingAllocations allocTable = (SchedulingAllocations)
         m_Main.Get(typeof(SchedulingAllocations));
      try
      {
         Scheduler s = new Scheduler( );
         PortCollection d = s.Init(msg.numExecutionUnits,
            msg.numSchedulingItemsPerUnit,
            msg.strDispatcherTag);
         if(d == null)
         {
            msg.ResultPort.Post(new msgFailureResult
               ("Failed allocating scheduler"));
            return;
         }
         d.Post(AllocationResourceType.Scheduling);
         allocTable.htSchedulers.Add(d,s);
         allocTable.numExecutionUnits += s.ThreadCount;
         Debug.WriteLineIf(TS.Core.TraceVerbose,
            "ResourceManager.Allocate: Total Execution
Units:"+allocTable.numExecutionUnits);
         msg.ResultPort.Post(new msgAllocateResourceResult(d));
      }
      catch
      {
         msg.ResultPort.Post(new msgFailureResult("Failed
            allocating scheduler"));
         return;
      }
      finally
      {
         m_Main.Post(allocTable);
      }
   }
   void AllocateMessage(object M)
   {
      msgAllocateMessageResource msg = (msgAllocateMessageRe-
```

-continued

```
    source) M;
    PortCollection pool = new PortCollection(msg.MessageType,
        typeof(AllocationResourceType),
        typeof(MessageAllocationContext));
    pool.Post(AllocationResourceType.Message);
    for(int i = 0;i<msg.numUnits;i++)
    {
      try
      {
        if (msg.MessageAllocator==null)
        {
          object [ ] args = {pool};
          object o = Activator.CreateInstance(msg.MessageType,
          args);
          pool.Post(o);
        }
        else
        {
          msg.MessageAllocator(pool);
        }
      }
      catch
      {
        msg.ResultPort.Post(
          new msgFailureResult("ResourceManager.Allo-
          cateMessage: Failed
allocating resource for type:"+msg.MessageType));
        return;
      }
    }
    MessageAllocations allocTable = (MessageAllocations)
      m_Main.Get(typeof(MessageAllocations));
    MessageAllocationContext context = new
MessageAllocationContext(msg.MessageType,msg.numUnits);
    pool.Post(context);
    pool.Post(AllocationResourceType.Message);
    allocTable.htMessagePools.Add(msg.MessageType.AssemblyQuali-
fiedName,pool);
    m_Main.Post(allocTable);
    msg.ResultPort.Post(new msgAllocateResourceResult(pool));
    }
  }
}
```

The following computer implemented instructions can be utilized to provide a port service.

```
{
  public delegate void Schedule(
  object state
  );
  public class MessageContext : ListEntry
  {
    public object Key;
    public object Value;
  }
  public class ReceiverContext
  {
    internal Schedule Receiver;
    internal readonly IPortCollection Dispatcher;
    public ReceiverContext(Schedule NamedReceiver,
      IPortCollection ScheduleDispatcher)
    {
      Dispatcher = ScheduleDispatcher;
      Receiver = NamedReceiver;
    }
  }
  public abstract class IPort
  {
    public abstract Guid Identity
    {
      get;
    }
    public abstract void RemoveAll(ArrayList store);
    public abstract object Test( );
    public abstract object Get( );
    public abstract void Post(Object Value);
    public abstract void RegisterReceiver(ReceiverContext Context);
    public abstract void UnregisterReceiver(Schedule S);
    public abstract bool IsReceiverActive( );
    internal abstract void Post(MessageContext ctx);
    internal abstract object TestInternal(ref WaitHandle doorbell);
    internal abstract object TestInternal( );
    internal abstract void TestInternal(ref MessageContext ctx);
  }
  public abstract class IPortCollection
  {
    public abstract Guid Identity
    {
      get;
    }
    public abstract string LocalName
    {
      get;
      set;
    }
    public abstract void AddPort(params object [ ] key);
    public abstract IPort GetPort(object key);
    public abstract object Get(object key);
    public abstract object Test(object key);
    public abstract void Post(object Value);
    public abstract void Post(object Key, object Value);
    public abstract void RegisterReceiver(object key, ReceiverContext
    Context);
    public abstract void RegisterReceiver(object key, Schedule Receiver,
IPortCollection PrivDispatcher);
    public abstract void UnregisterReceiver(object key);
    public abstract void UnregisterReceiver(object key,Schedule
    Receiver);
    internal abstract void TestInternal(object key,ref MessageContext
    ctx);
    internal abstract void Post(MessageContext msgCtx);
    public abstract WaitContext this [object key] {get;}
    public abstract WaitContext this [object key, Schedule S] {get;}
  }
  public enum PortOrderingTypes
  {
    ePortOrderRandom,
    ePortOrderFIFO,
    ePortOrderLIFO
  }
  public class Port : IPort
  {
    public Port(PortOrderingTypes Order)
    {
      OrderType = Order;
      Id = Guid.NewGuid( );
    }
    public Port( )
    {
    }
    PortOrderingTypes OrderType = PortOrderingTypes.
    ePortOrderRandom;
    Guid Id = Guid.NewGuid( );
    ManualResetEvent Doorbell = new ManualResetEvent(false);
    ArrayList Elements = new ArrayList( );
    ArrayList Receivers = new ArrayList( );
    public override Guid Identity
    {
      get
      {
        return Id;
      }
    }
    public override bool IsReceiverActive( )
    {
      lock (this)
      {
        if (Receivers.Count > 0)
          return true;
        else
          return false;
      }
    }
```

```
        public override object Test( )
        {
                object result = TestInternal( );
#if DEBUG || BIGWINRUNTIMEDEBUG
                if (result != null)
            MessageBreakpointManager.TestAndExecuteBreakpoint(result);
#endif
                return result;
        }
        internal override object TestInternal( )
        {
                MessageContext ctx = null;
                TestInternal(ref ctx);
                if (ctx!=null)
                        return ctx.Value;
                else
                        return null;
        }
    internal override object TestInternal(ref WaitHandle wh)
    {
        wh = Doorbell;
        return TestInternal( );
    }
    internal override void TestInternal(ref MessageContext ctx)
    {
      ctx = null;
      lock (this)
      {
        if (Elements.Count>0)
        {
          object res = Elements[Elements.Count−1];
          Elements.RemoveAt(Elements.Count−1);
          if(Elements.Count == 0)
            Doorbell.Reset( );
          ctx = (MessageContext)res;
                        return;
        }
      }
      return;
    }
    public override void RemoveAll(ArrayList List)
    {
      lock(this)
      {
        List.InsertRange(0,Elements);
        Elements.RemoveRange(0,Elements.Count);
        Doorbell.Reset( );
      }
    }
    public override object Get( )
    {
      object result = null;
      WaitHandle Doorbell = null;
      while (true)
      {
        result = TestInternal(ref Doorbell);
        if (result==null)
        {
          if (!Doorbell.WaitOne( ))
            break;
        }
        else
        {
          break;
        }
      }
      return result;
    }
    public override void Post(object Value)
    {
      MessageContext ctx = new MessageContext( );
      ctx.Value = Value;
      ctx.Key = Value.GetType( );
      Post(ctx);
    }
    internal override void Post(MessageContext ctx)
    {
      Debug.Assert(ctx.Key!=null,"Key cant be null");
      lock (this)
      {
        if (Dispatch(ctx))
          return;
        Buffer(ctx);
      }
    }
    internal void Buffer(MessageContext Item)
    {
      try
      {
        if (Elements.Contains(Item))
          throw new Exception("duplicate msg context detected");
        switch(OrderType)
        {
          case PortOrderingTypes.ePortOrderRandom:
            Elements.Add(Item);
            if(Elements.Count > 1)
            {
              int index = Primitives.Random.Next(Elements.Count−1);
              object s = Elements[Elements.Count−1];
              Elements[Elements.Count−1] = Elements[index];
              Elements[index] = s;
            }
            break;
          case PortOrderingTypes.ePortOrderLIFO:
            Elements.Add(Item);
            break;
          case PortOrderingTypes.ePortOrderFIFO:
            Elements.Insert(0,Item);
            break;
        }
        Doorbell.Set( );
      }
      catch (System.ObjectDisposedException)
      {
        Debug.WriteLineIf(TS.Core.TraceWarning,
          "portServices.cs: An attempt was made to post to a disposed
          port");
      }
    }
    internal bool Dispatch(MessageContext Item)
    {
      int count = Receivers.Count;
      for(int i =0;i<count;i++)
      {
        ReceiverContext context = (ReceiverContext)Receivers[i];
        if (InvokeReceiverSingle(context,Item))
        {
          return true;
        }
        if (Receivers.Count != count)
          i−−;
        count = Receivers.Count;
      }
      return false;
    }
    public override void RegisterReceiver(ReceiverContext Context)
    {
      lock (this)
      {
        AddReceiver(Context);
        SynchronizeReceiver(Context);
      }
    }
    public override void UnregisterReceiver(Schedule Receiver)
    {
      if (Receiver == null)
      {
        lock (this)
        {
          if (Receivers.Count == 1 )
          {
            Receiver = ((ReceiverContext)Receivers[0]).Receiver;
          }
          else
          {
            throw new Exception("Attempt to UnRegisterReceiver from port with none or with more than one");
          }
```

```
            }
          }
          RemoveReceiver(Receiver);
        }
        void AddReceiver(ReceiverContext ctx)
        {
          for(int i=0;i<Receivers.Count;i++)
          {
            ReceiverContext c = (ReceiverContext) Receivers[i];
            if (c.Receiver == ctx.Receiver)
            {
              return;
            }
          }
          Receivers.Add(ctx);
        }
        ReceiverContext RemoveReceiver(Schedule S)
        {
          lock (this)
          {
            for(int i=0;i<Receivers.Count;i++)
            {
              ReceiverContext ctx = (ReceiverContext) Receivers[i];
              if (ctx.Receiver == S)
              {
                Receivers.RemoveAt(i);
                return ctx;
              }
            }
          }
          return null;
        }
        void SynchronizeReceiver(ReceiverContext Context)
        {
          for(int i=Elements.Count−1;i>=0;i−−)
          {
            MessageContext msgCtx = (MessageContext)Elements[i];
            bool bConsumed = InvokeReceiverSingle(Context,msgCtx);
            if (bConsumed)
            {
              Elements.RemoveAt(i);
              if (Context.Dispatcher == null)
              {
                break;
              }
            }
          }
        }
        bool InvokeReceiverSingle(ReceiverContext ActiveReceiver,
MessageContext Item)
        {
          if (ActiveReceiver.Dispatcher == null)
            {
              ActiveReceiver.Receiver(Item);
              return Item.Key == null;
            }
            else
            {
              ActiveReceiver.Dispatcher.Post(new
msgScheduleContext(ActiveReceiver.Receiver,Item.Value));
              return true;
            }
        }
        public class PortCollection : IPortCollection
        {
          internal Hashtable htNodes = new Hashtable( );
          internal string m__LocalName;
          internal PortOrderingTypes OrderType = PortOrderingTypes.
          ePortOrderRandom;
          Guid Id;
          public override string LocalName
          {
            get
            {
              return m__LocalName;
            }
            set
            {
              lock(this)
              {
                m__LocalName = value;
              }
            }
          }
          public override Guid Identity
          {
            get
            {
              return Id;
            }
          }
          void Init( )
          {
            Id = Guid.NewGuid( );
          }
        public PortCollection(PortOrderingTypes Order)
        {
          OrderType = Order;
          Init( );
        }
        public PortCollection( )
        {
          Init( );
        }
        public PortCollection(PortOrderingTypes Order,params object [ ]
keys)
        {
          OrderType = Order;
          Init( );
          AddPort(keys);
        }
        public PortCollection(params object [ ] keys)
        {
          Init( );
          AddPort(keys);
        }
        public override void AddPort(params object [ ] Keys)
        {
          foreach(object o in Keys)
          {
            AddPortInternal(o);
          }
        }
        internal void AddPortInternal(object key)
        {
          lock(htNodes)
          {
            if (htNodes. Contains(key))
              return;
            Port child = new Port(OrderType);
            htNodes.Add(key,child);
          }
        }
        public ICollection GetPorts( )
        {
          lock (htNodes)
          {
            Port [ ] ar = new Port[htNodes.Count];
            htNodes.Values.CopyTo(ar,0);
            return ar;
          }
        }
        public override IPort GetPort(object key)
        {
          lock (htNodes)
          {
            return (IPort)htNodes[key];
          }
        }
        IPort GetPortInternal(object key)
        {
          lock (htNodes)
          {
            object o = htNodes[key];
            if(o == null)
              throw new PortNotFoundException("Port for key not
              found:"+key);
```

```
        return (IPort)o;
      }
    }
    public override object Get(object key)
    {
      IPort port = GetPortInternal(key);
      return port.Get( );
    }
    public override object Test(object K)
    {
      MessageContext msg = null;
      TestInternal(K,ref msg);
      if (msg!=null)
        return msg.Value;
      else
        return null;
    }
    internal override void TestInternal(object key, ref MessageContext
msg)
    {
      GetPortInternal(key).TestInternal(ref msg);
    }
    public override void Post(object Value)
    {
      Post(Value.GetType( ), Value);
    }
    public override void Post(object Key, object Value)
    {
      MessageContext ctx = new MessageContext( );
      ctx.Value = Value;
      ctx.Key = Key;
      Post(ctx);
    }
    internal override void Post(MessageContext msg)
    {
      GetPortInternal(msg.Key).Post(msg);
    }
    public override void RegisterReceiver(object key, Schedule Receiver,
IPortCollection PrivDispatcher)
    {
      RegisterReceiver(key,new ReceiverContext(Receiver,
         PrivDispatcher));
    }
    public override void RegisterReceiver(object key, ReceiverContext
Context)
    {
      GetPortInternal(key).RegisterReceiver(Context);
    }
    public override void UnregisterReceiver(object key)
    {
      UnregisterReceiver(key,null);
    }
    public override void UnregisterReceiver(object key,Schedule
Receiver)
    {
      GetPortInternal(key).UnregisterReceiver(Receiver);
    }
    public override WaitContext this [object key]
    {
      get
      {
        return new WaitContext(this,key);
      }
    }
    public override WaitContext this [object key, Schedule S]
    {
      get
      {
        return new WaitContext(this,key,S);
      }
    }
  }
  public class PortNotFoundException : System.Exception
  {
    public PortNotFoundException(string msg) : base(msg)
    {
    }
  }
}
```

The following computer implemented instructions can be utilized to provide a scheduler.

```
{
  class SchedulerThreadContext
  {
    public TimeSpan IdleExpiration;
    public Thread ThreadObject = null;
    public IPortCollection ListenPort = null;
    public void ScheduleExecution( )
    {
      WaitHandle wh = null;
           msgScheduleContext msgCtx;
      IPort ExecutionQueue = ListenPort.GetPort(typeof
         (msgScheduleContext));
      while (true)
      {
        msgCtx =
(msgScheduleContext)ExecutionQueue.TestInternal(ref wh);
        if (msgCtx == null)
        {
          if (wh.WaitOne(IdleExpiration,true))
             continue;
          else
             break;
        }
        try
        {
#if DEBUG
          Interlocked.Increment(ref RuntimeStatistics.
             ScheduledItems);
#endif
#if DEBUG || BIGWINRUNTIMEDEBUG
                    if(msgCtx.State != null)
          MessageBreakpointManager.TestAndExecuteBreakpoint(msgCtx.
             State);
#endif
                    msgCtx.S(msgCtx.State);
        }
        catch (Exception e)
        {
          Debug.WriteLineif(TS.Core.TraceError,
             "Exception not handled by schedule:"+e);
        }
        finally
        { }
      }
    }
  }
  public class Scheduler
  {
    public string Tag;
    TimeSpan DefaultExpiration = new TimeSpan(1,0,0,0,0);
    PortCollection m_MainPort = new PortCollection(
         PortOrderingTypes.ePortOrderFIFO,
         typeof(msgShutdown),
         typeof(msgGenerateSignal),
         typeof(AllocationResourceType),
         typeof(string),
         typeof(IPort),
         typeof(msgScheduleContext));
    ArrayList m_ThreadList = null;
    public IPortCollection portDispatcher
    {
      get
      {
        return m_MainPort;
      }
    }
    public int ThreadCount
    {
      get
      {
        return m_ThreadList.Count;
```

```
    }
  }
  public PortCollection Init(int numThreads, int SchedulingItemsPerUnit,
  string tag)
  {
    return Init(numThreads,SchedulingItemsPerUnit,DefaultExpiration,
      tag);
  }
  public PortCollection Init(int numThreads, int SchedulingItemsPerUnit,
  TimeSpan Expiration,string tag)
  {
    int i = 0;
    m__MainPort.LocalName = "Scheduler/MainDispatch/";
    m__ThreadList = new ArrayList(numThreads);
    Tag = tag;
    for (i=0;i<numThreads;i++)
    {
      AddThread(Expiration);
    }
    return m__MainPort;
  }
  void AddThread(TimeSpan Expiration)
  {
    SchedulerThreadContext ctx = new SchedulerThreadContext( );
    ctx.ListenPort = m__MainPort;
    ctx.IdleExpiration = Expiration;
    m__ThreadList.Add(ctx);
      Thread t = new Thread(
        new ThreadStart(ctx.ScheduleExecution));
      t.Name = Tag;
      ctx.ThreadObject = t;
      t.Start( );
  }
  public void Shutdown(msgShutdown msg)
  {
    foreach (SchedulerThreadContext ctx in m__ThreadList)
    {
      ctx.ThreadObject.Abort( );
    }
    msgShutdownResult res = new msgShutdownResult( );
    msg.ResultPort.Post(res);
  }
}
```

The following computer implemented instructions can be utilized to provide a sequencer.

```
{
  public class Sequencer
  {
  DateTime __nextExpiration = DateTime.Now.Add(TimeSpan.
  FromDays(1));
  Timer __Timer;
  IPortCollection __portDispatcher;
  IPortCollection __RequestQueue = new
  PortCollection(PortOrderingTypes.ePortOrderFIFO,
    typeof(Timer),
    typeof(msgGenerateSignal));
  IPort __PendingQueue = new Port(PortOrderingTypes.ePortOrderFIFO);
      public Sequencer( )
      {
      }
  public IPortCollection Init(IPortCollection Dispatcher)
  {
    __portDispatcher = Dispatcher;
    __RequestQueue.RegisterReceiver(typeof(msgGenerateSignal),
      new Schedule(ProcessRequest),
      __portDispatcher);
    __Timer = new Timer(new TimerCallback(SignalHandler),
      null,
      TimeSpan.FromDays(1),
      TimeSpan.FromDays(1));
    return __RequestQueue;
  }
```

```
  void ProcessRequest(object m)
  {
    msgGenerateSignal signal = (msgGenerateSignal)m;
    TimeSpan interval = (TimeSpan) signal.portClient.Test(typeof
    (TimeSpan));
    DateTime tNow = DateTime.Now;
    tNow.Add(interval);
    int repeat = (int) signal.portClient.Get(typeof(int));
    if (__nextExpiration > tNow)
    {
      __Timer.Change(interval,
        (repeat == 0) ? new TimeSpan(-1) : interval);
    }
    signal.portClient.Post(interval);
    signal.portClient.Post(tNow);
    signal.portClient.Post(repeat);
    __PendingQueue.Post(signal);
  }
  void SignalHandler(object m)
  {
    TimeSpan interval = TimeSpan.FromDays(1);
    DateTime now = DateTime.Now;
    __nextExpiration = now.Add(interval);
    ArrayList signals = new ArrayList( );
    object o = null;
    while ((o = __PendingQueue.Test( ))!=null)
    {
      signals.Add(o);
    };
    foreach(msgGenerateSignal signalReq in signals)
    {
      interval = (TimeSpan) signalReq.portClient.Get(typeof
      (TimeSpan));
      DateTime exp = (DateTime) signalReq.portClient.Test(typeof
      (DateTime));
      if (exp <= now)
      {
        msgPeriodicSignal msg = new msgPeriodicSignal(now);
        signalReq.portClient.Post(msg);
      }
      int repeat = (int) signalReq.portClient.Test(typeof(int));
      int rClone = repeat--;
      signalReq.portClient.Post(exp);
      signalReq.portClient.Post(repeat);
      signalReq.portClient.Post(interval);
      if (rClone>0)
      {
        exp = now.Add(interval);
        __PendingQueue.Post(signalReq);
        if (exp < __nextExpiration)
          __nextExpiration = exp;
      }
    }
    interval = __nextExpiration - now;
    __Timer.Change(interval,new TimeSpan(-1));
  }
  }
}
```

The following computer implemented instructions can be utilized to compose a signal generator and/or issue an asynchronous request to receive.

```
void Lookup( )
{
  msgWsapLookup lookup = new msgWsapLookup(__btTarget.Value,
    new LookupRequestType( ), portResponse);
  Common.WsapForwarder.Post(lookup);
  msgGenerateSignal msg = new msgGenerateSignal(new
  TimeSpan(20000000),1,__portResponse);
  __Common.Sequencer.Post(msg);
  Primitives.AsyncChoice(__portResponse[typeof
  (LookupResponseType),new Schedule(LookupRspHandler)]
  +
  portResponse[typeof(W3C.Soap.Fault), new Schedule(FaultHandler)]
```

-continued
```
        +
        portResponse[typeof(msgPeriodicSignal),new Schedule
        (TimeoutHandler)], Common.Dispatcher);
}
void TimeoutHandler(object m)
{
        Debug.WriteLineIf(TS.Services.TraceError,"ServiceMonitorHelper:
        Got timeout");
}
void FaultHandler(object m)
{
        Debug.WriteLineIf(TS.Services.TraceError,"ServiceMonitorHelper:
        Got fault");
}
void LookupRspHandler(object m)
{
}
```

The following computer implemented instructions can be utilized to implement join/choice in accordance with aspects of the present invention. These instructions allow dynamic accumulation of join statements (e.g., not fixed at compile time) and issuance of the accumulated set in a context of an asynchronous choice. This allows a resource manager (as described herein), client applications, etc. to leverage the join implementation and, optionally, commit all at once, which can mitigate deadlock. It is to be appreciated that dynamically accumulated join and/or choice branches can be issued by sending WaitContexts to another service or issuing an AsyncChoice, for example.

```
{
   public class ListEntry
   {
        internal ListEntry fLink;
        internal ListEntry bLink;
   }
   public class List :IList
   {
     int iCount = 0;
     ListEntry Token = new ListEntry( );
     public List( )
     {
       Token.fLink = Token;
       Token.bLink = Token;
     }
     #region IList Special Members
     public static implicit operator ListEntry(List L)
     {
        return L.Token;
     }
     public ListEntry Head
     {
       get
       {
          return Token.fLink;
       }
     }
     public ListEntry Tail
     {
       get
       {
          return Token.bLink;
       }
     }
     #endregion
     #region List PrivateMembers
     ListEntry Find(ListEntry v)
     {
        ListEntry p = (ListEntry)Token.fLink;
        while (p!=Token)
        {
           if(p == v)
              return p;
           p = p.fLink;
        }
        return null;
     }
     #endregion
     #region IList Members
     public bool IsReadOnly
     {
       get
       {
          return false;
       }
     }
     public object this[int index]
     {
       get
       {
          return null;
       }
       set
       {
       }
     }
     public void RemoveAt(int index)
     {
     }
     public void Insert(int index, object value)
     {
     }
     public void Remove(object value)
     {
        ListEntry v = (ListEntry)value;
        ListEntry b = v.bLink;
        ListEntry f = v.fLink;
        b.fLink = f;
        f.bLink = b;
        v.bLink = null;
        v.fLink = null;
     }
     public bool Contains(object value)
     {
        if (Find((ListEntry)value) != null)
           return true;
        else
           return false;
     }
     public void Clear( )
     {
        Token.bLink = Token.fLink = Token;
     }
     public int IndexOf(object value)
     {
        return 0;
     }
     public int Add(object value)
     {
        iCount++;
        ListEntry e = (ListEntry)value;
        if(Token.fLink == Token)
        {
           Token.fLink = e;
           Token.bLink = e;
           e.fLink = Token;
           e.bLink = Token;
           return iCount;
        }
        ListEntry head = Token.fLink;
        Token.fLink = e;
        e.bLink = Token;
        e.fLink = head;
        head.bLink = e;
        return iCount;
     }
     public bool IsFixedSize
     {
       get
       {
```

```
          return false;
        }
    }
#endregion
#region ICollection Members
public bool IsSynchronized
{
    get
    {
        return false;
    }
}
public int Count
{
    get
    {
        return iCount;
    }
}
public void CopyTo(Array array, int index)
{
}
public object SyncRoot
{
    get
    {
        return Token;
    }
}
#endregion
#region IEnumerable Members
public IEnumerator GetEnumerator( )
{
    return null;
}
#endregion
}
public class WaitContext
{
    public readonly IPort Port = null;
    public readonly IPortCollection PortCollection = null;
    internal HighwireMatcher Matcher = null;
    public readonly object Key = null;
    public object Msg = null;
    internal Schedule Continuation = null;
    internal int InitialJoinCount = 1;
    internal int JoinCount = 1;
    internal ArrayList ChoiceList = null;
    internal SortedList JoinList = null;
    internal ChoiceSemaphore ChoiceSemaphore= null;
    internal JoinSemaphore JoinSemaphore= null;
    internal Schedule ChoiceContinuation;
    internal Schedule JoinContinuation;
    void Init( )
    {
        ChoiceContinuation = new Schedule(ChoiceListener);
        JoinContinuation = new Schedule(JoinListener);
    }
    internal void AddJoinContext(WaitContext a)
    {
        if (JoinList == null)
        {
            JoinList = new SortedList( );
        }
        long id = a.GetTypePort( ).Identity;
        if (JoinList.Contains(id))
        {
            WaitContext ctx = (WaitContext) JoinList[id];
            ctx.InitialJoinCount++;
        }
        else
        {
            JoinList.Add(id,a);
        }
    }
    public WaitContext Clone( )
    {
        WaitContext wc = null;
        if (PortCollection != null)
            wc = new WaitContext(PortCollection,Key,Continuation);
        else
            wc = new WaitContext(Port,Continuation);
        wc.Matcher = this.Matcher;
        wc.Msg = this.Msg;
        return wc;
    }
    public WaitContext(IPort P)
    {
        Init( );
        Port = P;
    }
    public WaitContext(IPort P,
        Schedule S
        )
    {
        Init( );
        Continuation = S;
        Port = P;
    }
    public WaitContext(IPort P, HighwireMatcher M, Schedule S)
    {
        Init( );
        Port = P;
        Matcher = M;
        Continuation = S;
    }
    public WaitContext(IPort P, HighwireMatcher M)
    {
        Init( );
        Port = P;
        Matcher = M;
    }
    public WaitContext(IPortCollection P, object key)
    {
        Init( );
        PortCollection = P;
        Key = key;
    }
    public WaitContext(IportCollection P,object key,Schedule S)
    {
        Init( );
        PortCollection = P;
        Continuation = S;
        Key = key;
    }
    public static WaitContext operator +(WaitContext a, WaitContext b)
    {
        if(a.ChoiceList == null)
        {
            a.ChoiceList = new ArrayList( );
        }
        if(b.ChoiceList != null)
        {
            a.ChoiceList.AddRange(b.ChoiceList);
            b.ChoiceList = null;
        }
        a.ChoiceList.Add(b);
        return a;
    }
    public static WaitContext operator ^(WaitContext a, object o)
    {
        Type t = o.GetType( );
        PortCollection p = new PortCollection(t);
        p.Post(o);
        WaitContext wc = new WaitContext(p,t);
        return a^wc;
    }
    public static WaitContext operator ^(WaitContext a, Schedule S)
    {
        Debug.Assert(a.Continuation == null,"Schedule already specified for join context");
        return Primitives.ConstructJoinContext(a,S);
    }
    public static WaitContext operator ^(WaitContext a, WaitContext b)
    {
        if (a.JoinList == null)
        {
            a.JoinList = new SortedList( );
```

```
        }
        if (b.JoinList != null)
        {
            foreach(WaitContext c in b.JoinList.Values)
            {
                a.AddJoinContext(c);
            }
            b.JoinList = null;
        }
        a.AddJoinContext(b);
        return a;
    }
    internal IPort GetTypePort( )
    {
        IPort pT = this.Port;
        if (this.PortCollection!=null)
            pT = this.PortCollection.GetPort(Key);
        return pT;
    }
    internal bool Compare(IPort p, HighwireMatcher Matcher)
    {
        object value = ((MessageContext)Msg).Value;
        if (p.Identity == 0Port.Identity && Matcher.Equals(this.Matcher))
            return true;
        else
            return false;
    }
    internal bool Compare(IPortCollection p, Type T)
    {
        if (PortCollection == p &&
            GetTypePort( ) == p.GetPort(T))
            return true;
        else
            return false;
    }
    internal void Test(ref MessageContext msg)
    {
        if (PortCollection != null)
        {
            PortCollection.TestInternal(Key, ref msg);
        }
        else
        {
            if (Matcher = null)
            {
                Port.TestInternal(ref msg);
                return;
            }
            bool bMatch = false;
            ArrayList 1 = new ArrayList( );
            do
            0{
                Port.TestInternal(ref msg);
                if(msg != null)
                {
                    if (Matcher.Match(msg.Value))
                    {
                        bMatch = true;
                        break;
                    }
                    else
                    {
                        1.Add(msg);
                    }
                }
            } while (msg != null);
            foreach (MessageContext c in 1)
            {
                Port.Post(c);
            }
            if(bMatch == false)
                msg = null;
        }
    }
    internal void Post(MessageContext msg)
    {
        if (PortCollection!=null)
            PortCollection.Post(msg);
        else
            Port.Post(msg);
    }
    internal void ChoiceListener(object M)
    {
        MessageContext ctx = (MessageContext)M;
        if (Matcher!=null && !Matcher.Match(ctx.Value))
            return;
        ChoiceSemaphore.AttemptCommit(this,ctx);
    }
    internal void JoinListener(object M)
    {
        MessageContext ctx = (MessageContext)M;
        if (Matcher!=null && !Matcher.Match(ctx.Value))
            return;
        JoinSemaphore.Decrement(this,ctx);
    }
    internal void RegisterChoiceListener(ChoiceSemaphore cs)
    {
        ChoiceSemaphore = cs;
        RegisterListener(ChoiceContinuation);
    }
    internal void RegisterJoinListener(JoinSemaphore js)
    {
        JoinSemaphore = js;
        RegisterListener(JoinContinuation);
    }
    internal void RegisterListener(Schedule Listener)
    {
        ReceiverContext ctx = new ReceiverContext(Listener,null);
        IPortp = GetTypePort( );
        p.RegisterReceiver(ctx);
        return;
    }
    internal void UnregisterChoiceListener( )
    {
        IPortp = GetTypePort( );
        p.UnregisterReceiver(ChoiceContinuation);
    }
    internal void UnregisterJoinListener( )
    {
        IPortp = GetTypePort( );
        p.UnregisterReceiver(JoinContinuation);
    }
    public static implicit operator WaitResult(WaitContext a)
    {
        return Primitives.SyncChoice(a);
    }
}
public class WaitResult
{
    public readonly WaitContext ActionTaken = null;
    public Object Msg
    {
        get
        {
            return ActionTaken.Msg;
        }
    }
    internal WaitResult(WaitContext a)
    {
        ActionTaken = a;
    }
    public bool this [WaitContext C]
    {
        get
        {
            if (ActionTaken == C)
                return true;
            else
                return false;
        }
    }
    public bool this [Type MsgType]
    {
        get
        {
            if (ActionTaken.Msg.GetType( ) == MsgType)
                return true;
            else
```

```
            return false;
         }
      }
      public bool this [IPortCollection p,Type MsgType]
      {
         get
         {
            if (ActionTaken.Compare(p,MsgType))
               return true;
            else
               return false;
         }
      }
   }
   internal class ChoiceSemaphore
   {
      System.Threading.ManualResetEvent Doorbell;
      internal readonly IPortCollection portDispatcher;
      volatile ArrayList Branches = null;
      volatile WaitContext Winner = null;
      internal int Count = 0;
#if DEBUG || TRACE
      ~ChoiceSemaphore( )
      {
         RuntimeDiagnostics.Unregister(this.GetHashCode( ));
      }
#endif
      public ChoiceSemaphore(ArrayList Items, IPortCollection
Dispatcher, bool bSync)
      {
#if DEBUG || TRACE
         RuntimeDiagnostics.Register(this);
#endif
         portDispatcher = Dispatcher;
         if(bSync)
            Doorbell = new System.Threading.ManualResetEvent(false);
         Branches = Items;
         if (((WaitContext)Branches[0]).Matcher == null)
         {
            portDispatcher.Post(new msgScheduleContext(new
Schedule(RegisterListeners),
                  null));
         }
         else
         {
            RegisterListeners(null);
         }
      }
      void RegisterListeners(object o)
      {
         foreach(WaitContext ctx in Branches)
         {
            Debug.Assert ((ctx.Continuation != null && Doorbell ==
null) ||
                  (ctx.JoinContinuation != null && Doorbell == null) ||
                  (ctx.Continuation == null && Doorbell != null),
                  "ChoiceSemaphore.RegisterListeners:You must supply a
continuation for all branches");
            if (Count > 0)
               break;
            if (ctx.JoinList!=null)
            {
               ctx.ChoiceSemaphore = this;
               JoinSemaphore j = new JoinSemaphore(ctx,portDispatcher);
            }
            else
            {
               ctx.RegisterChoiceListener(this);
            }
         }
      }
      void CleanupHandler(object w)
      {
         WaitContext winner = (WaitContext)w;
         lock (this)
         {
            foreach(WaitContext ctx in Branches)
            {
               if (ctx != winner)
               {
                  if (ctx.JoinSemaphore!=null)
                  {
                     ctx.JoinSemaphore.Cleanup( );
                  }
                  else
                  {
                     ctx.UnregisterChoiceListener( );
                  }
               }
            }
         }
         if (winner.Continuation!=null)
            winner.Continuation(winner.Msg);
         else
         {
            Winner = winner;
            Doorbell.Set( );
         }
      }
      public WaitContext Wait( )
      {
         Doorbell.WaitOne( );
         return Winner;
      }
      public void AttemptCommit(WaitContext potentialWinner,
MessageContext msgCtx)
      {
         int result = Interlocked.CompareExchange(ref Count,
               1,
               0);
         if (potentialWinner.JoinList==null)
            potentialWinner.UnregisterChoiceListener( );
         if (result == 1)
         {
            Interlocked.Increment(ref RuntimeDiagnostics.ChoiceFailed-
Commits);
         }
         else
         {
            Interlocked.Increment(ref RuntimeDiagnostics.ChoiceCommits);
            potentialWinner.Msg = msgCtx.Value;
            msgCtx.Key = null;
            if (potentialWinner.JoinList!=null || potentialWinner.Matcher !=
null)
               CleanupHandler(potentialWinner);
            else
            {
               portDispatcher.Post(new msgScheduleContext(new
Schedule(CleanupHandler),
                     potentialWinner));
            }
         }
      }
   }
   internal class JoinSemaphore
   {
      WaitContext Accumulator = null;
      ICollection Branches = new ArrayList( );
      Hashtable MessageTable = new Hashtable( );
      internal readonly IPortCollection portDispatcher;
      internal int Count = 0;
      internal int InitialCount = 0;
      int CleanupPending = 0;
      internal JoinSemaphore(WaitContext Accum,IPortCollection
Dispatcher)
      {
         lock (this)
         {
            Debug.Assert(portDispatcher == null);
            portDispatcher = Dispatcher;
            Accumulator = Accum;
            Accumulator.JoinSemaphore = this;
            InitialCount = 0;
         }
         foreach(WaitContext ctx in Accumulator.JoinList.Values)
         {
            ctx.JoinCount = ctx.InitialJoinCount;
            InitialCount += ctx.JoinCount;
```

-continued

```
            if (ctx.ChoiceList!= null)
            {
                throw new Exception("Nested choice WaitContexts not
allowed inside a Join WaitContext");
            }
        }
        Branches = Accumulator.JoinList.Values;
        0Count = InitialCount;
        RegisterListeners(true);
    }
    bool IsCleanupPending( )
    {
        return CleanupPending > 0;
    }
    internal void Cleanup( )
    {
        if (Interlocked.Increment(ref CleanupPending) == 1)
        {
            foreach(WaitContext ctx in Accumulator.JoinList.Values)
            {
                ctx.UnregisterJoinListener( );
            }
            object o = null;
            lock (this)
            {
                MessageTable.Clear( );
                if (Accumulator.Msg!=null)
                {
                    o = Accumulator.Msg;
                    Accumulator.Msg = null;
                }
            }
            if(o != null)
                portDispatcher.Post(new msgScheduleContext(new
Schedule(CleanupCommitted),o));
        }
    }
    void CleanupCommitted(object jr)
    {
        JoinResult j = (JoinResult)jr;
        foreach(WaitContext ctx in j.ContextList)
        {
            ctx.Post((MessageContext)ctx.Msg);
        }
    }
    internal void RegisterListeners(object r)
    {
        if (IsCleanupPending( ))
            return;
        Count = InitialCount;
        MessageTable.Clear( );
        foreach(WaitContext c in Branches)
        {
            c.JoinCount = c.initialJoinCount;
            c.RegisterJoinListener(this);
            if (IsCleanupPending( ))
                return;
        }
    }
    bool TrackMessage(MessageContext msgCtx)
    {
        lock (this)
        {
            if (MessageTable.Contains(msgCtx))
                return false;
            MessageTable.Add(msgCtx,null);
        }
        return true;
    }
    internal void Decrement(WaitContext Branch,MessageContext
msgCtx)
    {
        if (Thread.VolatileRead(ref Branch.JoinCount) == 0)
            return;
        if (!TrackMessage(msgCtx))
            return;
        if (Interlocked.Decrement(ref Branch.JoinCount) == 0)
        {
            Branch.UnregisterJoinListener( );
```

-continued

```
        }
        if (Interlocked.Decrement(ref Count) == 0)
        {
            portDispatcher.Post(new msgScheduleContext(new
Schedule(CommitJoin),null));
        }
        return;
    }
    internal void CommitJoin(object notUsed)
    {
        if (IsCleanupPending( ))
            return;
        int i = InitialCount;
        ArrayList fallBack = new ArrayList( );
        WaitContext f = null;
        foreach(WaitContext ctx in Branches)
        {
            for (int ii = 0;ii<ctx.InitialJoinCount;ii++)
            {
                if (IsCleanupPending( ))
                    break;
                MessageContext msg = null;
                ctx.Test(ref msg);
                if (msg !=null)
                {
                    i--;
                    f = ctx.Clone( );
                    f.Msg = msg;
                    fallBack.Add(f);
                }
            }
            if (i == 0)
                break;
        }
        if (i == 0)
        {
#if DEBUG || TRACE
            Interlocked.Increment(ref RuntimeDiagnostics.JoinCommits);
#endif
            Accumulator.Msg = new JoinResult(fallBack);
            MessageContext ctx = new MessageContext( );
            ctx.Key = typeof(JoinResult);
            ctx.Value = Accumulator.Msg;
            Accumulator.ChoiceSemaphore.AttemptCommit(Accumu-
lator,ctx);
        }
        else
        {
#if DEBUG || TRACE
            Interlocked.Increment(ref RuntimeDiagnostics.JoinRetries);
#endif
            JoinRetryHandler(fallBack);
        }
        return;
    }
    internal void JoinRetryHandler(object f)
    {
        ArrayList Fallback = (ArrayList) f;
        foreach(WaitContext ctx in Fallback)
        {
            ctx.Post((MessageContext)ctx.Msg);
        }
        RegisterListeners(true);
    }
}
public class JoinResult
{
    internal readonly ArrayList ContextList;
    internal JoinResult(ArrayList WaitContextList)
    {
        ContextList = WaitContextList;
    }
    public object this [IPort p]
    {
        get
        {
            int i = 0;
            foreach(WaitContext ctx in ContextList)
            {
```

-continued

```
        if(ctx.Port == p)
        {
            ContextList.RemoveAt(i);
            return ((MessageContext)ctx.Msg).Value;
        }
        i++;
    }
    return null;
    }
}
public object this [IPort p,HighwireMatcher Matcher]
{
    get
    {
        int i = 0;
        foreach(WaitContext ctx in ContextList)
        {
            if (ctx.Compare(p,Matcher))
            {
                ContextList.RemoveAt(i);
                return ((MessageContext)ctx.Msg).Value;
            }
            i++
        }
        return null;
    }
}
public object this [HighwireMatcher Matcher]
{
    get
    {
        int i = 0;
        foreach(WaitContext ctx in ContextList)
        {
            if (ctx.Compare(ctx.Port,Matcher))
            {
                ContextList.RemoveAt(i);
                return ((MessageContext)ctx.Msg).Value;
            }
            i++
        }
        return null;
    }
}
public object this [IPortCollection p,Type MsgType]
{
    get
    {
        int i = 0;
        foreach(WaitContext ctx in ContextList)
        {
            if (ctx.Compare(p,MsgType))
            {
                ContextList.RemoveAt(i);
                return ((MessageContext)ctx.Msg).Value;
            }
            i++;
        }
        return null;
    }
}
public object this [Type MsgType]
{
    get
    {
        int i = 0;
        foreach(WaitContext ctx in ContextList)
        {
            MessageContext msg = (MessageContext)ctx.Msg;
            if (ctx.Compare(ctx.PortCollection,MsgType))
            {
                ContextList.RemoveAt(i);
                return msg.Value;
            }
            i++;
        }
        return null;
    }
}
```

-continued

```
    }
    public class Primitives
    {
        internal static long PortIdCounter = 0;
        public static IPortCollection SyncChoiceDispatcher = null;
        public static Random Random = new Random((int)Date-
Time.Now.Ticks);
        internal static ArrayList CreateFlatChoiceList(WaitContext Accum,
IPortCollection Dispatcher)
        {
            ArrayList Items = Accum.ChoiceList;
            if (Items == null)
                Items = new ArrayList( );
            Accum.ChoiceList = null;
            Items.Add(Accum);
            return Items;
        }
        public static void AsyncChoice(WaitContext Accumulator,IPort-
Collection Dispatcher)
        {
            ArrayList Items = CreateFlatChoiceList(Accumulator,Dispatcher);
            ChoiceSemaphore c = new ChoiceSemaphore(Items,Dis-
patcher,false);
        }
        public static WaitResult SyncChoice(WaitContext Accumulator)
        {
            ArrayList Items = CreateFlatChoiceList(Accumulator,null);
            ChoiceSemaphore c = new ChoiceSemaphore(Items,SyncChoice-
Dispatcher,true);
            return new WaitResult(c.Wait( ));
        }
        public static WaitContext ConstructJoinContext(WaitContext
Accumulator, Schedule Continuation)
        {
            Debug.Assert(Accumulator.Continuation == null,"Only one
continuation can be supplied to join");
            Accumulator.Continuation = Continuation;
            Accumulator.AddJoinContext(Accumulator);
            return Accumulator;
        }
    }
}
```

The following provides a portion of an exemplary service that can leverage choice/join. This exemplary service looks at some directories, concurrently and/or asynchronously issues a request to files in respective directories, and utilizes a dynamically created join to collect responses (e.g., out of order) as they complete. In this example, execution continues when all files have been looked at or at least one failure occurred.

```
PortCollection enumDirResult = new PortCollection(typeof(msgParent),
typeof(msgDone));
WaitContext joins = enumDirResult[typeof(msgParent)];
for (int cnt=0; cnt<subDirs.Length+1; cnt++)
{
    joins = enumDirResult[typeof(msgDone)];
}
enumDirResult.Post(new msgParent(msg.DonePort));
msgEnumFilesRequest msgFiles = new msgEnumFilesRequest(dir,
enumDirResult);
m__Internal.Post(msgFiles);
Primitives.AsyncChoice(joinBranch, m__Common.Dispatcher)
```

Figure 11:
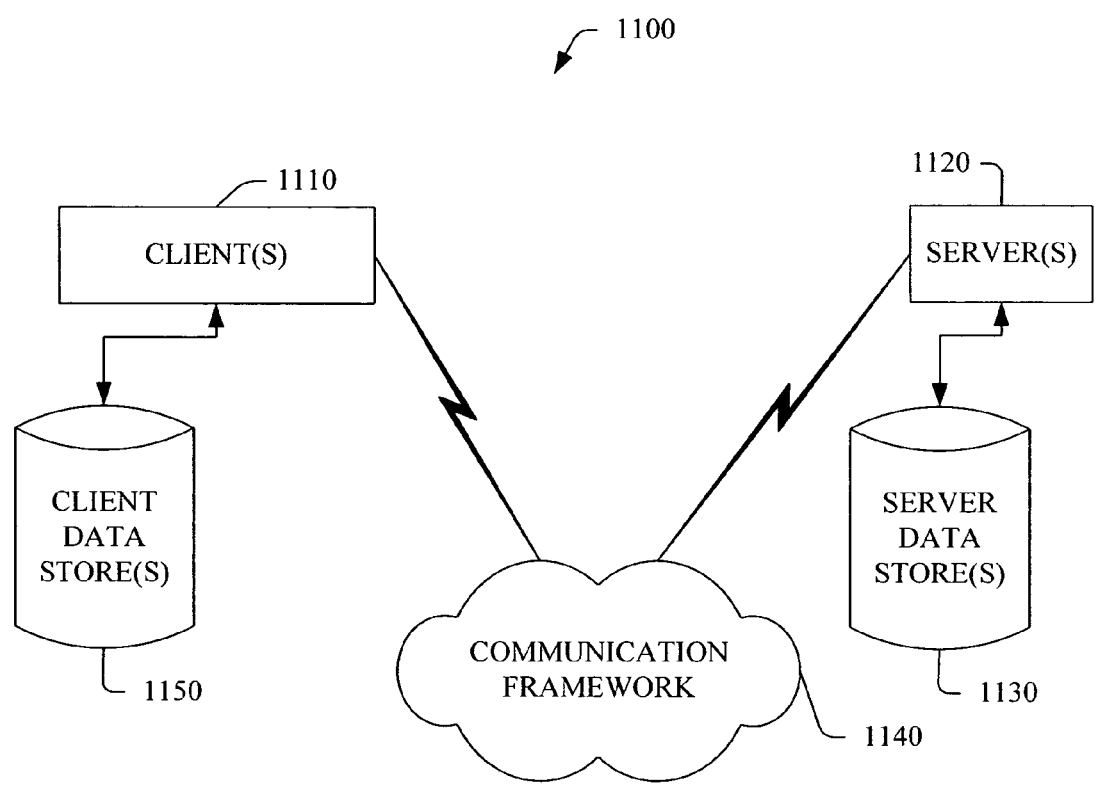
FIG. 11 illustrates an exemplary networking environment, wherein the novel aspects of the present invention can be employed.
Figure 12:
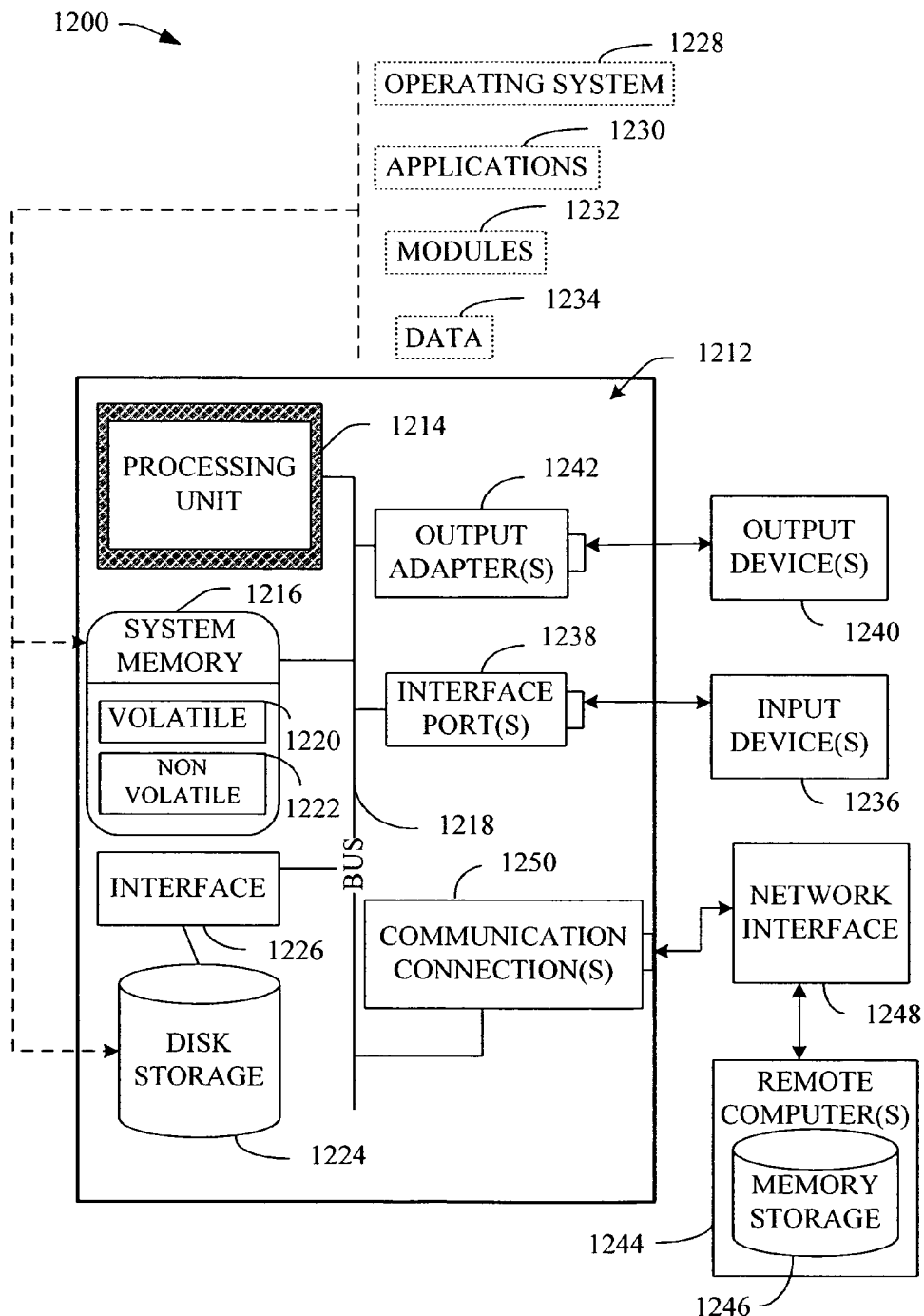
FIG. 12 illustrates an exemplary operating environment, wherein the novel aspects of the present invention can be employed.

In order to provide additional context for implementing various aspects of the present invention, FIGS. 11-12 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the present invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for managing processing resources of a computing entity, comprising:

a first processor that executes tasks;

a first receiving port that receives from a client an asynchronous request for processing resources associated with the first processor of the computing entity; and a first resource manager that allocates the processing resources when the processing resources become available, preempts or places the asynchronous request in one of a plurality of queues if available processing resources are not sufficient to fulfill the request, searches the one of the plurality of queues for the asynchronous request based on queue priority levels to obtain reply information, and transmits a communication to a specified reply port associated with the client or another client, the communication including at least a context of execution that is utilized to execute a task associated with the asynchronous request, the allocated resources being accounted by requiring the client to request for the processing resources prior to accessing any of the processing resources.

2. The system of claim 1, wherein the asynchronous request at least includes one or more of a request for memory, the context of execution, periodicity, an item of execution, a continuation, and the reply port.

3. The system of claim 1, wherein the processing resources at least comprise memory and the context of execution, indicative of one or more processor, to be allocated.

4. The system of claim 1, wherein the context of execution is associated with the first processor.

5. The system of claim 1, wherein the request is an interrupt that preempts current execution.

6. The system of claim 1, wherein the plurality of queues are associated with disparate priority levels, wherein the request is stored in a queue with a similar priority level.

7. The system of claim 1, wherein the resource manager preempts the asynchronous request in order to mitigate consumption of the processing resources.

8. The system of claim 1, further comprising:

a second processor that executes tasks;

a second port associated with the second processor; and a second resource manager that listens behind the second port.

9. The system of claim 1, wherein the first processor resides in an idle state until it is allocated to execute the task.

10. The system of claim 1, further comprising a signal generator that is utilized to transmit communications with periodicity.

11. The system of claim 10, wherein the periodicity is varied via joins that define a number of ticks that occur before a communication is transmitted.

12. The system of claim 10, wherein the periodicity is varied via joins that define a number of events that occur before a communication is transmitted.

13. The system of claim 1, wherein the first receiving port concurrently receives a plurality of communications and queues the communications.

14. The system of claim 1, wherein the system is modeled utilizing at least one of pi and join calculus.

15. A computer-implemented method for managing processing resources of a computing entity in a communication based computing system, the method comprising:

employing a first processor to execute tasks;

receiving from a client an asynchronous communication requesting for processing resources associated with the first processor of the computing entity, the request being preempted or placed in one of a plurality of queues if available processing resources are not sufficient to fulfill the request; and when the processing resources become available, performing acts including:
   allocating processing resources of the computing entity to execute a task;
   searching the one of the plurality of queues for the request based on queue priority levels to obtain reply information; and
   providing access to the allocated processing resources for execution of the task by sending a reply communication to the client associated with the asynchronous communication, the reply communication including at least a context of execution that is utilized to execute a task associated with the request, the allocated processing resources being accounted by requiring the client to request for the processing resources prior to accessing any of the processing resources.

16. The method of claim 15, wherein the asynchronous communication includes a request that at least specifies a desired memory, a context of execution, and a reply port associated with the client or another client.

17. The method of claim 15, wherein the reply communication includes a location of allocated memory and a context of execution associated with a second processor.

18. The method of claim 17, wherein the first processor resides in a low processor cycle consumption state until allocated for the task.

19. The method of claim 15, further comprising preempting access to the processing resources.

20. The method of claim 15, further comprising employing a priority scheme to store communications in a plurality of storage banks based on communication priority.

21. The method of claim 15, further comprising utilizing a signal generator to send communications with periodicity by associating the signal generator and utilizing a join mechanism that couples resource consumption with a clock period.

22. The method of claim 15, further comprising utilizing a signal generator to preempt access to the processing resources.

23. The method of claim 15, wherein the acts are performed using process algebra.

24. The method of claim 15, further comprising re-writing received synchronous code to an asynchronous choice request with a continuation attached and employing the re-written code.

25. The method of claim 15, further comprising implementing a time out by counting communications.

26. The method of claim 15, further comprising utilizing a message received on a port to throttle utilization of resources to provide a scale invariant technique to control execution.

27. The method of claim 20, further comprising dynamically accumulating join statements and issuing the accumulated statements in a context of an asynchronous choice to mitigate deadlocks.

28. A method for transmitting a communication including one or more data packets to be transmitted between two or more computer components that facilitate processing resource management, comprising:
   receiving from a client an asynchronous communication requesting for processing resources, the processing resources including memory and a context of execution of a processor, the request being preempted or placed in one of a plurality of queues if available processing resources are not sufficient to fulfill the request;
   when the processing resources are available, performing acts including:
      allocating the processing resources to perform an item of execution, the processing resources being allocated only when the asynchronous communication is completed;
      searching the one of the plurality of queues for the request based on queue priority levels to obtain reply information; and
      sending a reply communication to provide a location of the memory and access to the context of execution of the processor, the allocated processing resources being accounted by requiring the client to request for the processing resources prior to accessing any of the processing resources.

29. Computer executable components stored on a computer readable medium that facilitate managing processing resources in a free running computing environment, comprising:
   a first component that receives an asynchronous communication from a client at a receiving port of a processor, wherein the asynchronous communication at least includes a request for a context of execution and a reply port associated with the client, the request being preempted or placed in one of a plurality of queues if the context of execution is not available;
   a second component that allocates the context of execution when the context of execution becomes available; and
   a third component that searches the one of the plurality of queues for the request based on queue priority levels to obtain reply information, and transmits a notification to the reply port when the context of execution is available to process an item of execution, the allocated processing resources being accounted by requiring the client to request for the processing resources prior to accessing any of the processing resources.

30. A system that facilitates managing processing resources, comprising:
   a processor that executes tasks;
   means for receiving an asynchronous request from a client for processing resources associated with the processor which is a part of a computing entity, the asynchronous request being preempted or placed in one of a plurality of queues if available processing resources are not sufficient to fulfill the request;
   means for invoking allocation of the processing resources when the processing resources become available;
   means for searching the one of the plurality of queues for the asynchronous request based on queue priority levels to obtain reply information, and transmitting a communication to a reply port associated with the client or another client; and
   means for selectively providing access to the allocated processing resources, the allocated processing resources being accounted by requiring the client to request for the processing resources prior to accessing any of the processing resources.

* * * * *